(12) United States Patent
Honda et al.

(10) Patent No.: US 12,633,621 B2
(45) Date of Patent: May 19, 2026

(54) SEPARATOR FOR NON-AQUEOUS SECONDARY BATTERY AND NON-AQUEOUS SECONDARY BATTERY

(71) Applicant: TEIJIN LIMITED, Osaka (JP)

(72) Inventors: Susumu Honda, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 669 days.

(21) Appl. No.: 17/604,790

(22) PCT Filed: Jun. 3, 2020

(86) PCT No.: PCT/JP2020/021912
§ 371 (c)(1),
(2) Date: Oct. 19, 2021

(87) PCT Pub. No.: WO2020/246497
PCT Pub. Date: Dec. 10, 2020

(65) Prior Publication Data
US 2022/0200098 A1 Jun. 23, 2022

(30) Foreign Application Priority Data

Jun. 4, 2019 (JP) ................................. 2019-104514

(51) Int. Cl.
*H01M 50/446* (2021.01)
*B32B 5/24* (2006.01)
(Continued)

(52) U.S. Cl.
CPC ............. *H01M 50/446* (2021.01); *B32B 5/24* (2013.01); *B32B 7/12* (2013.01); *C09J 7/29* (2018.01);
(Continued)

(58) Field of Classification Search
CPC ............. H01M 50/446; H01M 50/489; H01M 50/443; H01M 50/449
See application file for complete search history.

(56) References Cited

U.S. PATENT DOCUMENTS

2002/0055036 A1 5/2002 Shinohara et al.
2010/0099022 A1 4/2010 Nishida et al.
(Continued)

FOREIGN PATENT DOCUMENTS

CN 102569701 A 7/2012
JP 2001-240460 A 9/2001
(Continued)

OTHER PUBLICATIONS

International Search Report of PCT/JP2020/021912 dated Aug. 25, 2020 [PCT/ISA/210].

*Primary Examiner* — Olatunji A Godo
(74) *Attorney, Agent, or Firm* — Sughrue Mion, PLLC

(57) ABSTRACT

An embodiment of the present invention provides a separator for a non-aqueous secondary battery containing a porous substrate; a heat-resistant porous layer that is provided on one side or on both sides of the porous substrate, and that contains a binder resin and inorganic particles, the inorganic particles having an average primary particle diameter from 0.01 μm to less than 0.45 μm; and an adhesive layer that is provided on one side or on both sides of a laminated body of the porous substrate and the heat-resistant porous layer, and adhesive resin particles adhered to the laminated body.

14 Claims, 1 Drawing Sheet

(51) Int. Cl.

| | |
|---|---|
| *B32B 7/12* | (2006.01) |
| *C09J 7/29* | (2018.01) |
| *C09J 7/38* | (2018.01) |
| *C09J 127/16* | (2006.01) |
| *H01M 10/0525* | (2010.01) |
| *H01M 50/443* | (2021.01) |
| *H01M 50/449* | (2021.01) |
| *H01M 50/489* | (2021.01) |
| *C08K 3/22* | (2006.01) |
| *C08K 3/30* | (2006.01) |

(52) U.S. Cl.

CPC ............. *C09J 7/381* (2018.01); *C09J 127/16* (2013.01); *H01M 10/0525* (2013.01); *H01M 50/443* (2021.01); *H01M 50/449* (2021.01); *H01M 50/489* (2021.01); *B32B 2457/10* (2013.01); *C08K 3/22* (2013.01); *C08K 2003/2224* (2013.01); *C08K 2003/3045* (2013.01); *C09J 2203/33* (2013.01); *C09J 2301/122* (2020.08); *C09J 2301/124* (2020.08); *C09J 2301/16* (2020.08); *C09J 2301/41* (2020.08); *C09J 2400/163* (2013.01); *C09J 2427/00* (2013.01); *C09J 2433/00* (2013.01); *C09J 2477/006* (2013.01); *C09J 2479/086* (2013.01)

(56) References Cited

U.S. PATENT DOCUMENTS

| | | | |
|---|---|---|---|
| 2014/0050965 | A1 | 2/2014 | Ha et al. |
| 2014/0287294 | A1 | 9/2014 | Lee et al. |
| 2015/0221917 | A1 | 8/2015 | Sakamoto et al. |
| 2015/0270523 | A1 | 9/2015 | Toyoda et al. |
| 2015/0333308 | A1 | 11/2015 | Toyoda et al. |
| 2015/0349312 | A1 | 12/2015 | Ha et al. |
| 2016/0260948 | A1 | 9/2016 | Nishimoto |
| 2017/0338457 | A1 | 11/2017 | Shang et al. |
| 2017/0338459 | A1 | 11/2017 | Nakahiro et al. |
| 2018/0097216 | A1 | 4/2018 | Joo et al. |
| 2018/0123106 | A1* | 5/2018 | Shin ................... H01M 50/403 |
| 2019/0027728 | A1* | 1/2019 | Xie .................... H01M 50/491 |
| 2020/0006734 | A1 | 1/2020 | Murakami et al. |
| 2020/0185676 | A1* | 6/2020 | Lee .................... H01M 10/052 |
| 2020/0266407 | A1* | 8/2020 | Honda ............... H01M 50/426 |
| 2020/0343511 | A1 | 10/2020 | Nagao et al. |
| 2021/0057703 | A1 | 2/2021 | Hamada et al. |
| 2021/0167393 | A1* | 6/2021 | Kuzuoka ............ H01M 50/434 |
| 2021/0218049 | A1* | 7/2021 | Nakagawa ........ H01M 10/0585 |

FOREIGN PATENT DOCUMENTS

| | | | |
|---|---|---|---|
| JP | 2007-48738 A | | 2/2007 |
| JP | 2008-243805 A | | 10/2008 |
| JP | 2011-023186 A | | 2/2011 |
| JP | 2013-020769 A | | 1/2013 |
| JP | 2014-149935 A | | 8/2014 |
| JP | 2015-69957 A | | 4/2015 |
| JP | 5946257 B2 | | 7/2016 |
| JP | 5971662 B2 | | 8/2016 |
| JP | 5976015 B2 | | 8/2016 |
| JP | 6112115 B2 | | 4/2017 |
| JP | 2018-530860 A | | 10/2018 |
| JP | 6513893 B1 | | 5/2019 |
| KR | 10-2016-0109669 A | | 9/2016 |
| WO | 2012/023197 A1 | | 2/2012 |
| WO | 2013/151144 A1 | | 10/2013 |
| WO | 2014/030507 A1 | | 2/2014 |
| WO | WO2017082258 | * | 5/2017 |

* cited by examiner

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2020/021912, filed Jun. 3, 2020, claiming priority to Japanese Patent Application No. 2019-104514, filed Jun. 4, 2019, the contents of all of which are incorporated herein by reference in their entirety.

TECHNICAL FIELD

The present invention relates to a separator for a non-aqueous secondary battery and a non-aqueous secondary battery.

BACKGROUND ART

Non-aqueous secondary batteries represented by lithium ion secondary batteries are widely used as power sources for portable electronic devices such as notebook-size personal computers, mobile phones, digital cameras and camcorders. Recently, for a non-aqueous secondary battery represented by a lithium ion secondary battery, an application thereof as a battery for electric power storage or electric vehicles is being reviewed due to the property of a high energy density thereof.

With the spread of non-aqueous secondary batteries, it is increasingly required to ensure safety and stable battery characteristics. Specific measures for ensuring safety and stable battery characteristics include increasing heat resistance of a separator and increasing adhesion between the electrode and the separator.

As a separator having increased heat resistance, a separator including a heat-resistant porous layer containing at least one of inorganic particles and a heat-resistant resin is known. As a separator having increased adhesiveness to an electrode, a separator including an adhesive layer containing a resin having adhesiveness to an electrode is known. For example, a separator disclosed in the following Patent Literatures 1 to 7 includes both a heat-resistant porous layer and an adhesive layer.

Patent Literature 1: Japanese Patent No. 5971662
Patent Literature 2: Japanese Patent No. 5976015
Patent Literature 3: Japanese Patent No. 5946257
Patent Literature 4: Japanese Patent No. 6112115
Patent Literature 5: International Publication No. 2013/151144
Patent Literature 6: Japanese Patent Application Laid-Open (JP-A) No. 2013-20769
Patent Literature 7: Japanese Patent No. 6513893

SUMMARY OF INVENTION

Technical Problem

However, in the separator including both the heat-resistant porous layer and the adhesive layer as in the conventional technique, since the number of layers is large, the film thickness of the entire separator tends to be large. From the viewpoint of improving the energy density of the battery, it is preferable that the separator is further thinned. On the other hand, it is conceivable to form a thin heat-resistant porous layer for thinning the separator. However, when the heat-resistant porous layer is formed to be thin, the heat resistance of the separator tends to decrease. As described above, in the separator including both the heat-resistant porous layer and the adhesive layer, the thinning and the heat resistance of the separator are in a trade-off relationship with each other. Therefore, how to make the thinning and heat resistance of the separator compatible has become a technical subject.

The embodiment of the present disclosure has been made under the above circumstances.

An object of the embodiment of the present disclosure is to provide a separator for a non-aqueous secondary battery capable of achieving both thinning and heat resistance in a separator for a non-aqueous secondary battery including a heat-resistant porous layer and an adhesive layer.

Solution to Problem

The specific solutions to the problem include the following embodiments:

[1] A separator for a non-aqueous secondary battery, the separator containing:

a porous substrate;

a heat-resistant porous layer that is provided on one side or on both sides of the porous substrate, and that contains a binder resin and inorganic particles, the inorganic particles having an average primary particle diameter from 0.01 μm to less than 0.45 μm; and an adhesive layer that is provided on one side or on both sides of a laminated body of the porous substrate and the heat-resistant porous layer, and adhesive resin particles adhered to the laminated body.

[2] The separator for a non-aqueous secondary battery according to [1], wherein a heat shrinkage ratio of the separator for a non-aqueous secondary battery, when heat-treated at 150° C. for 1 hour, is 10% or less in an MD direction and in a TD direction.

[3] The separator for a non-aqueous secondary battery according to [1] or [2], wherein a heat shrinkage ratio of the separator for a non-aqueous secondary battery, when heat-treated at 130° C. for 1 hour, is 6% or less in an MD direction and in a TD direction.

[4] The separator for a non-aqueous secondary battery according to any one of [1] to [3], wherein a porosity of the heat-resistant porous layer is from 30% to 70%.

[5] The separator for a non-aqueous secondary battery according to any one of [1] to [4], wherein a mass ratio of the inorganic particles in the heat-resistant porous layer is 50% by mass to 90% by mass with respect to a total mass of the heat-resistant porous layer.

[6] The separator for a non-aqueous secondary battery according to any one of [1] to [5], wherein the inorganic particles contain at least one selected from the group consisting of magnesium type particles and barium type particles.

[7] The separator for a non-aqueous secondary battery according to any one of [1] to [6], wherein the binder resin contains at least one selected from the group consisting of a wholly aromatic polyamide, a polyamideimide and a polyimide.

[8] The separator for a non-aqueous secondary battery according to any one of [1] to [7], wherein the adhesive resin particles contain a mixture of first adhesive resin particles including a polyvinylidene fluoride type resin, and second adhesive resin particles including an acrylic type resin.

[9] The separator for a non-aqueous secondary battery according to any one of [1] to [8], wherein a mass per unit area of the heat-resistant porous layer as a total of both sides is from 2.0 g/m² to 10.0 g/m².

[10] The separator for a non-aqueous secondary battery according to any one of [1] to [9], wherein a thickness of the heat-resistant porous layer is 0.5 μm to 4.0 μm per one side.

[11] The separator for a non-aqueous secondary battery according to any one of [1] to [10], wherein a difference between a Gurley value of the separator for a non-aqueous secondary battery and a Gurley value of the porous substrate is from 20 seconds/100 mL to 300 seconds/100 mL.

[12] A non-aqueous secondary battery that obtains electromotive force by lithium doping and dedoping, the non-aqueous secondary battery containing:

a positive electrode;

a negative electrode; and the separator for a non-aqueous secondary battery according to any one of [1] to [11] the separator being disposed between the positive electrode and the negative electrode.

Advantageous Effects of Invention

According to the present disclosure, it is possible to provide a separator for a non-aqueous secondary battery, in which the separator includes a heat-resistant porous layer and an adhesive layer, the separator is capable of achieving both thinning and heat resistance.

DESCRIPTION OF EMBODIMENTS

Figure 1A:
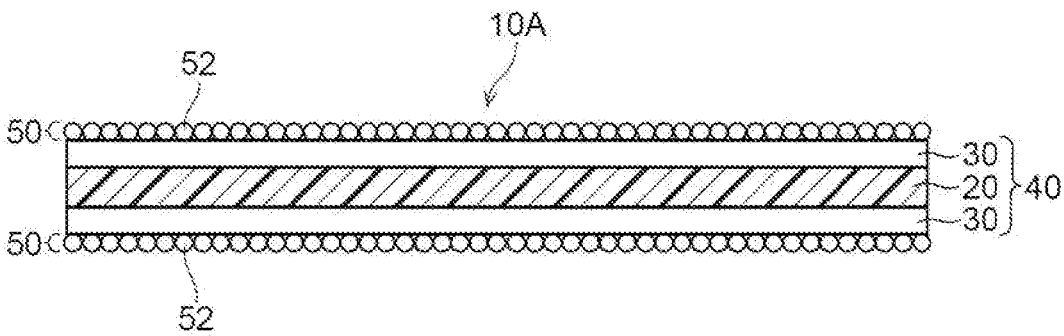
FIG. 1A is a schematic cross-sectional view illustrating an embodiment of a separator for a non-aqueous secondary battery of the present disclosure.

Hereinafter, the embodiments will be described. Further, the description and the Examples thereof illustrate the embodiments, but do not limit the scope of the embodiments.

In the present disclosure, the numerical range denoted by using "to" represents the range inclusive of the number written before and after "to" as the minimum and maximum values. Regarding stepwise numerical ranges designated in the present disclosure, an upper or lower limit set forth in a certain numerical range may be replaced by an upper or lower limit of another stepwise numerical range described. Besides, an upper or lower limit set forth in a certain numerical range of the numerical ranges designated in the disclosure may be replaced by a value indicated in Examples.

In the present disclosure, the term "process" includes not only an independent process, but also the process which is not clearly distinguished from other processes but achieves the desired purpose thereof.

In the present disclosure, when the amount of each component in a composition is referred to and when a plurality of substances corresponding to each component are present in the composition, the total amount of the plurality of components present in the composition is meant unless otherwise specified.

In the present disclosure, a "MD direction" means a longitudinal direction (that is, the conveyance direction) in a porous substrate and a separator manufactured into an long shape, and is also referred to as a "machine direction". In addition, a "TD direction" means a direction orthogonal to the "MD direction", and is also referred to as a "transverse direction".

In the present disclosure, a combination of two or more preferred aspects is a more preferred aspect.

In the present disclosure, when there are a plurality of substances corresponding to each component in the composition, the amount of each component in a composition or a layer means the total amount of a plurality of substances present in the composition unless otherwise specified.

In the present disclosure, "% by mass" and "% by weight" have the same meaning, and "parts by mass" and "parts by weight" have the same meaning.

In the present disclosure, in a case where a lamination relationship among layers constituting a separator is expressed as "upper" and "lower", a layer closer to a substrate is referred to as "lower", and a layer farther from the substrate is referred to as "upper".

When an embodiment is described with reference to the drawings in the present disclosure, the configuration of the embodiment is not limited to the configuration illustrated in the drawings. In addition, the sizes of the members in each drawing are conceptual, and the relative relationship between the sizes of the members is not limited thereto.

In the present disclosure, the notation of "(meth)acrylic" means "acrylic" or "methacrylic".

A weight average molecular weight (Mw) in the present disclosure is a value measured by gel permeation chromatography (GPC).

Specifically, a sample of the polyethylene microporous membrane is heated and dissolved in o-dichlorobenzene, and Mw is obtained by performing measurement by GPC (Alliance GPC 2000 type manufactured by Waters Corporation, column; GMH6-HT and GMH6-HTL) under the conditions of a column temperature of 135° C. and a flow rate of 1.0 mL/min. For calibration of the molecular weight, molecular weight monodisperse polystyrene (manufactured by Tosoh Corporation) can be used.

The heat-resistant resin in the present disclosure refers to a resin having a melting point of 180° C. or higher, or a resin having no melting point and a decomposition temperature of 180° C. or higher. That is, the heat-resistant resin in the present disclosure is a resin that does not melt and decompose in a temperature range of lower than 180° C.

<Separator for Non-Aqueous Secondary Battery>

A separator for a non-aqueous secondary battery (hereinafter, the separator is also simply referred to as a "separator") according to the present disclosure includes: a porous substrate; a heat-resistant porous layer that is provided on one side or on both sides of the porous substrate, and that contains a binder resin and inorganic particles, the inorganic particles having an average primary particle diameter from 0.01 μm to less than 0.45 μm; and an adhesive layer that is provided on one side or on both sides of a laminated body of the porous substrate and the heat-resistant porous layer, and adhesive resin particles adhered to the laminated body.

An example of a layer configuration of the separator of the present disclosure will be described with reference to the drawings.

FIGS. 1A to 1D are each a schematic cross-sectional view of an exemplary embodiment of a separator of the present disclosure. FIGS. 1A to 1D are schematic cross-sectional views mainly for describing a stacking order of layers, in which a structure of each layer is omitted or simplified. In FIGS. 1A to 1D, layers having similar functions will be described with the same reference numerals.

A separator 10A illustrated in FIG. 1A is a separator in which heat-resistant porous layers 30 are disposed on both sides of a porous substrate 20, and adhesive layers 50 are disposed on both sides of a laminate 40 of the porous substrate 20 and two heat-resistant porous layers 30.

Figure 1B:
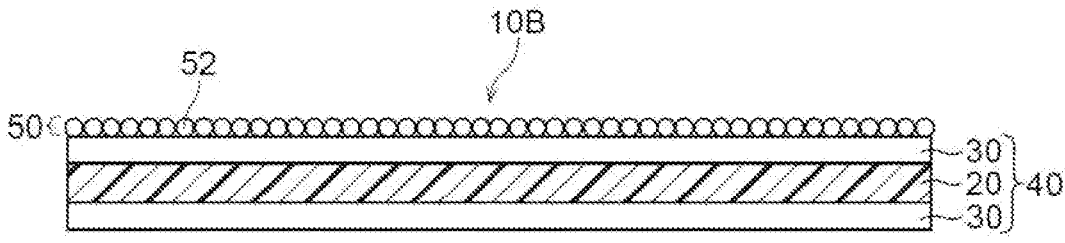
FIG. 1B is a schematic cross-sectional view illustrating another embodiment of a separator for a non-aqueous secondary battery of the present disclosure.

A separator 10B illustrated in FIG. 1B is a separator in which the heat-resistant porous layers 30 are disposed on both sides of the porous substrate 20, and the adhesive layer 50 is disposed on one side of the laminated body 40 of the porous substrate 20 and the two heat-resistant porous layers 30.

Figure 1C:
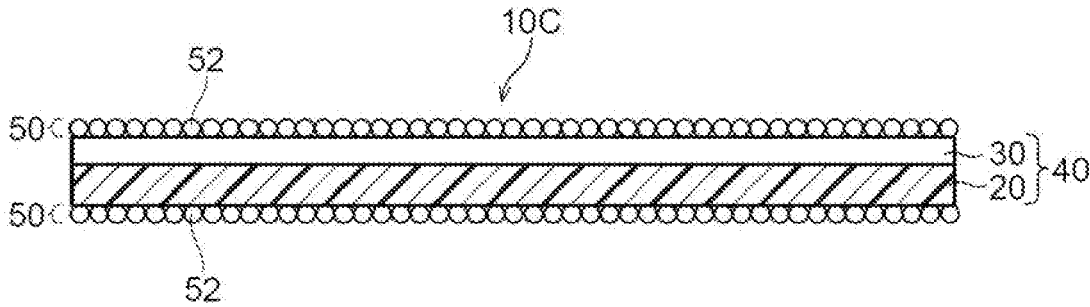
FIG. 1C is a schematic cross-sectional view illustrating another embodiment of a separator for a non-aqueous secondary battery of the present disclosure.

A separator 10C illustrated in FIG. 1C is a separator in which the heat-resistant porous layer 30 is disposed on one side of the porous substrate 20, and the adhesive layers 50 are disposed on both sides of laminated body 40 of the porous substrate 20 and one heat-resistant porous layer 30.

Figure 1D:
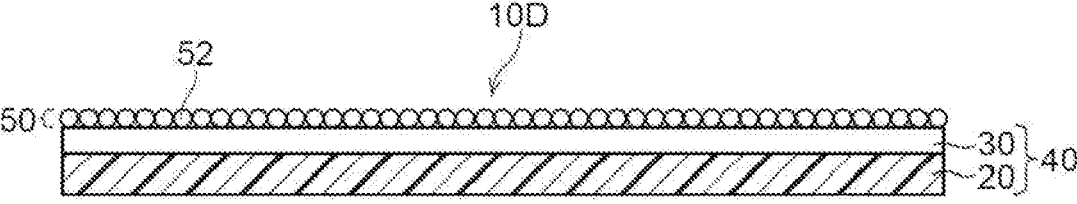
FIG. 1D is a schematic cross-sectional view illustrating another embodiment of a separator for a non-aqueous secondary battery of the present disclosure.

A separator 10D illustrated in FIG. 1D is a separator in which the heat-resistant porous layer 30 is disposed on one side of the porous substrate 20, and the adhesive layer 50 is disposed on one side of the laminated body 40 of the porous substrate 20 and one heat-resistant porous layer 30. In the separator 10D, the adhesive layer 50 is disposed on a surface of the heat-resistant porous layer 30.

Furthermore, although not illustrated, the separator of the present disclosure may be a separator in which a heat-resistant porous layer is disposed on one side of a porous substrate and an adhesive layer is disposed on the other side of the porous substrate.

Heat-Resistant Porous Layer

The heat-resistant porous layer in the present disclosure is a layer disposed on the porous substrate (preferably on the surface of the porous substrate). The heat-resistant porous layer may be provided only on one side of the porous substrate or on both sides of the porous substrate. When the heat-resistant porous layer is present on both sides of the porous substrate, the heat resistance of the separator is more excellent, and the safety of the battery can be further enhanced. In addition, curling is less likely to occur in the separator, and the handleability during the manufacturing of the battery is excellent. When the heat-resistant porous layer is present only on one side of the porous substrate, ion permeability of the separator is more excellent. In addition, the thickness of the entire separator can be suppressed, and a battery having a higher energy density can be manufactured.

Examples of the form of the heat-resistant porous layer include the following forms (a) and (b).

Form (a):

It is a porous layer in which the heat-resistant porous layer contains a binder resin and inorganic particles, and the inorganic particles are bound by the binder resin.

Form (b):

A heat-resistant porous layer includes an inner layer formed on a porous substrate and containing a binder resin and inorganic particles, and a porous film formed so as to cover an outer surface of the inner layer and containing a binder resin. The inner layer has a porous structure in which inorganic particles are bound by a binder resin, and has a diameter larger than that of the porous film. The heat-resistant porous layer has a so-called skin-core structure as a whole.

Adhesive Layer

The adhesive layer in the present disclosure is a layer disposed on the surface of the porous substrate or the heat-resistant porous layer, and exists as the outermost layer of the separator. The adhesive layer may be on only one side of the laminated body or on both sides of the laminated body. When the adhesive layer is present only on one side of the laminated body, the adhesive layer is preferably disposed on the surface of the heat-resistant porous layer. Whether the adhesive layer is disposed on one side or both sides of the laminated body may be selected according to the composition or surface properties of the positive electrode or the negative electrode of the battery. When the adhesive layer is disposed only on one side of the laminated body, the thickness of the entire separator can be suppressed, and a battery having a higher energy density can be produced.

The adhesive layer in the present disclosure is a layer in which adhesive resin particles adhered to a surface of a laminated body.

For example, in the separators 10A to 10D, the adhesive layer 50 has a structure in which a large number of adhesive resin particles 52 are arranged adjacent to each other on the surface of the laminated body 40 to form a layer, and has a single-layer structure in which the adhesive resin particles 52 do not overlap in a thickness direction. However, the structure of the adhesive layer in the present disclosure is not limited to the above structure, and may have a structure in which a large number of adhesive resin particles are interspersed on the surface of the laminated body, or may have a multilayer structure of two or more layers in which a plurality of adhesive resin particles overlap in the thickness direction. The adhesive layer in the present disclosure preferably has a structure in which a large number of adhesive resin particles are arranged adjacent to each other on the surface of the laminated body from the viewpoint of more excellent adhesiveness to the electrode, and preferably has a single-layer structure in which the adhesive resin particles do not overlap in the thickness direction from the viewpoint of increasing the energy density of the battery.

Hereinafter, details of the porous substrate, the heat-resistant porous layer, and the adhesive layer included in the separator of the present disclosure will be described.

Porous Substrate

The porous substrate in the present disclosure refers to a substrate having pores or voids therein. As the substrate, a microporous film; a porous sheet such as non-woven fabric and paper, composed of a fibrous material; and the like may be listed. In the present disclosure, a microporous film is preferable from the viewpoint of thinning and strength of a separator. The microporous film refers to a film having a large number of micropores therein, having a structure in which these micropores are connected to each other, and allowing gas or liquid to pass from one side to the other side.

As the material for the porous substrate, materials having electrical insulation are preferably used and any of organic materials and inorganic materials may be used.

It is preferred that the porous substrate contains a thermoplastic resin, from the viewpoint of imparting a shutdown function to the porous substrate. The shutdown function refers to a function of dissolving the constituent material to clog the pores of the porous substrate, thereby blocking ionic migration, and preventing thermal runaway of a battery, when the battery temperature is raised. As the thermoplastic resin, a thermoplastic resin having a melting point less than 200° C. is preferred. As the thermoplastic resin, for example, polyesters such as polyethylene terephthalate; polyolefins such as polyethylene and polypropylene; and the like may be mentioned, and among them, polyolefins are preferred.

As the porous substrate, a microporous film containing polyolefin (referred to as "polyolefin microporous film") is preferred. As the polyolefin microporous film, for example, a polyolefin microporous film which is applied to the conventional separator for a battery may be mentioned, and among them, it is preferred to select those having sufficient mechanical properties and ion permeability.

It is preferred that the polyolefin microporous film contains polyethylene, from the viewpoint of exhibiting the shutdown function. The content of polyethylene contained in the polyolefin microporous film is preferably 95% by mass or more with respect to the total mass of the polyolefin microporous film.

It is preferred that the microporous film contains polypropylene, from the viewpoint of imparting heat resistance to the extent that the film is not easily broken when exposed to a high temperature.

It is preferred that the polyolefin microporous film contains polyethylene and polypropylene, from the viewpoint of imparting shutdown function and heat resistance that the film is not easily broken when exposed to a high temperature. As the polyolefin microporous film, a microporous film in which polyethylene and polypropylene are present in a mixed state in a layer may be mentioned. It is preferred that the microporous film contains 95% by mass or more of polyethylene and 5% by mass or less of polypropylene, from the viewpoint of compatibility of the shutdown function and heat resistance. In addition, from the viewpoint of compatibility of the shutdown function and heat resistance, a polyolefin microporous film having a lamination structure with two or more layers, in which at least one layer contains polyethylene and at least one layer contains polypropylene, is also preferred.

As the polyolefin contained in the polyolefin microporous film, a polyolefin having a weight average molecular weight (Mw) of from 100,000 to 5,000,000 is preferred. When the polyolefin has a Mw of 100,000 or more, favorable mechanical properties may be provided to the microporous film. Meanwhile, when the polyolefin has a Mw of 5,000,000 or less, the shutdown characteristic of the microporous film is favorable, and film molding of the microporous film is easy.

Examples of the method for manufacturing the polyolefin microporous film include, a method containing extruding a molten polyolefin resin from a T-die to form a sheet, crystallizing and elongating the sheet, and further subjecting the sheet to heat treatment, thereby obtaining a microporous film; and a method containing extruding a polyolefin resin melted with a plasticizer such as liquid paraffin from a T-die, cooling it to form a sheet, elongating the sheet, extracting the plasticizer, and performing heat treatment, thereby obtaining a microporous film.

As the porous sheet composed of a fibrous material, non-woven fabric composed of fibrous materials such as polyesters such as polyethylene terephthalate; polyolefins such as polyethylene and polypropylene; heat-resistant resins such as wholly aromatic polyamide, polyamideimide, polyimide, polyethersulfone, polysulfone, polyetherketone and polyetherimide; cellulose; and the like, or paper may be mentioned.

The surface of the porous substrate may be subjected to various surface treatments within the range of not impairing the nature of the porous substrate, for the purpose of improving wettability with the coating liquid for forming the heat-resistant porous layer or with the resin particles dispersing liquid for forming the adhesive layer. As the surface treatment, corona treatment, plasma treatment, flame treatment, UV irradiation treatment, and the like may be mentioned.

Characteristics of Porous Substrate

The thickness of the porous substrate is preferably 12 μm or less, more preferably 10 μm or less, from the viewpoint of enhancing energy density of the battery. Further, the thickness of the porous substrate is preferably 3.0 μm or more, more preferably 5.0 μm or more, from the viewpoint of production yield of the separator and production yield of the battery.

The Gurley value of the porous substrate (JIS P8117: 2009) is preferably from 50 sec/100 ml to 400 sec/100 ml and more preferably from 50 sec/100 ml to 200 sec/100 ml from the viewpoint of obtaining favorable ion permeability or suppression of battery short circuit.

The porosity of the porous substrate is preferably 20% to 60% from the viewpoint of obtaining appropriate membrane resistance and shutdown function.

The porosity of the porous substrate is obtained according to the following calculation method. That is, when the constituent materials are a, b, c, . . . , and n, the masses of the constituent materials are Wa, Wb, Wc, . . . , and Wn (g/cm²), a true density of the constituent materials are da, db, dc, . . . , and dn (g/cm³), and a film thickness is t (cm), a porosity ε (%) is obtained from the following formula.

$$\varepsilon = \{1 - (Wa/da + Wb/db + Wc/dc + \ldots + Wn/dn)/t\} \times 100$$

The puncture strength of the porous substrate is preferably 200 g or more from the viewpoint of production yield of the separator and production yield of the battery.

The puncture strength of the porous substrate is measured by performing a puncture test under the condition of a curvature radius of a needle tip of 0.5 mm, and a puncture speed of 2 mm/sec, using a KES-G5 handy compression tester from KATO TECH CO., LTD., to obtain a maximum puncture load (g).

Heat-Resistant Porous Layer

The heat-resistant porous layer in the present disclosure is provided on one side or both sides of the porous substrate, and contains a binder resin and inorganic particles having an average primary particle diameter from 0.01 μm to less than 0.45 μm. The heat-resistant porous layer is a coating film having a large number of micropores and allowing a gas or a liquid to pass from one side to the other side.

The kind of the binder resin of the heat-resistant porous layer is not particularly limited as long as being able to bond inorganic particles. The binder resin of the heat-resistant porous layer is preferably a heat-resistant resin from the viewpoint of improving heat resistance of the separator. The binder resin of the heat-resistant porous layer is preferably a resin that is stable to an electrolytic solution and is also electrochemically stable. The binder resins may be used singly or in combination of two or more kinds thereof.

Specific examples of the binder resin of the heat-resistant porous layer include a polyvinylidene fluoride type resin, a wholly aromatic polyamide, a polyamideimide, a polyimide, a polyether sulfone, a polysulfone, a polyether ketone, a polyketone, a polyether imide, a poly-N-vinylacetamide, a polyacrylamide, a copolymerized polyether polyamide, a fluorine type rubber, an acrylic type resin, a styrene-butadiene copolymer, a cellulose, and a polyvinyl alcohol.

The binder resin of the heat-resistant porous layer may be a particulate resin, and examples thereof include resin particles of a polyvinylidene fluoride type resin, a fluorine type rubber, and a styrene-butadiene copolymer. The binder resin of the heat-resistant porous layer may be a water-soluble resin such as a cellulose or a polyvinyl alcohol. When a particulate resin or a water-soluble resin is used as the binder resin of the heat-resistant porous layer, the binder resin is dispersed or dissolved in water to prepare a coating liquid, and the heat-resistant porous layer can be formed on a porous substrate using the coating liquid by a dry coating method.

As the binder resin of the heat-resistant porous layer, a heat-resistant resin containing at least one selected from the group consisting of a wholly aromatic polyamide, a polyamideimide, and a polyimide, is preferable from the viewpoint of excellent heat resistance. Among the heat-resistant resins, a wholly aromatic polyamide is preferable from the viewpoint of durability. A meta type or para type wholly aromatic polyamide may be used. Among wholly aromatic polyamides, a meta type wholly aromatic polyamide is preferable from viewpoints of easy formation of a porous layer and excellent oxidation-reduction resistance in an electrode reaction. A small amount of an aliphatic monomer may be copolymerized in a wholly aromatic polyamide.

As the wholly aromatic polyamide used as the binder resin of the heat-resistant porous layer, specifically, polymetaphenylene isophthalamide or polyparaphenylene terephthalamide is preferable, and polymetaphenylene isophthalamide is more preferable.

As the binder resin of the heat-resistant porous layer, a polyvinylidene fluoride type resin (PVDF type resin) is preferable from the viewpoint of adhesiveness between the heat-resistant porous layer and the adhesive layer.

Examples of the PVDF type resin include a homopolymer of vinylidene fluoride (that is, polyvinylidene fluoride); a copolymer of vinylidene fluoride and another monomer (polyvinylidene fluoride copolymer); and a mixture of polyvinylidene fluoride and a polyvinylidene fluoride copolymer. Examples of the monomer copolymerizable with vinylidene fluoride include tetrafluoroethylene, hexafluoropropylene, trifluoroethylene, chlorotrifluoroethylene, trichloroethylene, vinyl fluoride, trifluoroperfluoropropyl ether, ethylene, (meth)acrylic acid, methyl (meth)acrylate, (meth)acrylate, vinyl acetate, vinyl chloride, and acrylonitrile. These monomers may be used singly or in combination of two or more kinds thereof. The PVDF type resin preferably has a weight average molecular weight (Mw) of from 600,000 to 3,000,000. The PVDF type resin preferably has an acid value of from 3 mgKOH/g to 20 mgKOH/g. The acid value of the PVDF type resin can be controlled, for example, by introducing a carboxy group into the PVDF type resin. The introduction and introduction amount of a carboxy group into the PVDF type resin can be controlled by using a monomer having a carboxy group as a polymerization component of the PVDF type resin (for example, (meth)acrylic acid, (meth)acrylate, maleic acid, maleic anhydride, maleate, and fluorine-substituted products thereof), and controlling a polymerization ratio thereof.

Examples of the inorganic particles in the present disclosure may include, but are not particularly limited, particles of metal hydroxides such as aluminum hydroxide, magnesium hydroxide, calcium hydroxide, chromium hydroxide, zirconium hydroxide, cerium hydroxide, nickel hydroxide, and boron hydroxide; particles of metal oxides such as silica, alumina, zirconia, magnesium oxide, and barium titanate; particles of carbonates such as calcium carbonate and magnesium carbonate; particles of sulfates such as barium sulfate and calcium sulfate, and the like. The inorganic particles are preferably particles containing at least one selected from the group consisting of magnesium-based particles and barium-based particles from the viewpoint of stability to an electrolytic solution and electrochemical stability.

Here, the magnesium-based particles mean inorganic particles containing a magnesium compound, and specific examples thereof include magnesium hydroxide and magnesium oxide.

The barium-based particles mean inorganic particles containing a barium compound, and specific examples thereof include barium sulfate and barium titanate.

The inorganic particles may be surface-modified with a silane coupling agent or the like.

The particle shape of the inorganic particles is not limited, and may be any of a spherical shape, an elliptical shape, a plate shape, a needle shape, and an amorphous shape. The inorganic particles contained in the heat-resistant porous layer are preferably plate-shaped particles or non-aggregated primary particles from the viewpoint of suppressing a short circuit of a battery.

The inorganic particles may be used singly or in combination of two or more kinds thereof.

It is important that the average primary particle diameter of the inorganic particles contained in the heat-resistant porous layer is from 0.01 μm to less than 0.45 μm. When the average primary particle diameter of the inorganic particles is 0.01 μm or more, aggregation of particles can be suppressed to form a highly uniform heat-resistant porous layer. From such a viewpoint, the average primary particle diameter of the inorganic particles is more preferably 0.05 μm or more, and more preferably 0.10 μm or more. When the average primary particle diameter of the inorganic particles is less than 0.45 μm, heat resistance can be enhanced even in the configuration in which the heat-resistant porous layer is thinned. This mechanism is considered as follows. That is, when the particle size of the inorganic particles is small, the surface area (specific surface area) of the inorganic particles per unit volume increases. Therefore, the number of contact points between the inorganic particles and the binder resin increases. As a result, shrinkage of the heat-resistant porous layer when exposed to a high temperature is suppressed. In addition, it is presumed that since a large number of inorganic particles having a small particle size are connected to each other, the heat-resistant porous layer is less likely to be broken when exposed to a high temperature. From such a viewpoint, the average primary particle diameter of the inorganic particles is more preferably 0.40 μm or less, still more preferably 0.30 μm or less, and particularly preferably 0.20 μm or less.

The average primary particle diameter of the inorganic particles is obtained by measuring major diameters of 100 inorganic particles randomly selected in observation with a scanning electron microscope (SEM), and averaging the major diameters of 100 inorganic particles. The sample to be subjected to the observation of the SEM is inorganic particles as a material of the heat-resistant porous layer or inorganic particles taken out from the separator. The method of taking out the inorganic particles from the separator is not limited, and examples thereof include a method in which the separator is heated to about 800° C. to remove the binder resin and take out the inorganic particles, and a method in which the separator is immersed in an organic solvent to dissolve the binder resin with the organic solvent and take out the inorganic particles.

In the present disclosure, the mass ratio of the inorganic particles in the heat-resistant porous layer is preferably 50% by mass to 90% by mass with respect to the total mass of the heat-resistant porous layer. When the mass ratio of the inorganic particles in the heat-resistant porous layer is 50% by mass or more, the heat resistance of the separator can be suitably enhanced, and from such a viewpoint, the mass ratio is more preferably 55% by mass or more, and still more preferably 60% by mass or more. The mass ratio of the inorganic particles in the heat-resistant porous layer is preferably 90% by mass or less, more preferably 85% by mass or less, and still more preferably 80% by mass or less from the viewpoint that the heat-resistant porous material is hardly peeled off from the porous substrate.

The heat-resistant porous layer may contain an additive, for example, a dispersant such as a surfactant, a wetting agent, an antifoaming agent, or a pH adjuster. The dispersant is added to a coating liquid for forming a heat-resistant porous layer for the purpose of improving dispersibility, coatability, or storage stability. The wetting agent, the anti-foaming agent, or the pH adjuster is added to a coating liquid for forming a heat-resistant porous layer for the purpose of, for example, improving compatibility with the porous sub-strate, suppressing mixing of air into the coating liquid, or adjusting the pH.

Characteristics of Heat-Resistant Porous Layer

In the separator of the present disclosure, the thickness of the heat-resistant porous layer is preferably 0.5 μm or more per one side, and more preferably 0.8 μm or more per one side from the viewpoint of the heat resistance or the handle-ability of the separator, and is preferably 4.0 μm or less per one side, and more preferably 3.5 μm or less per one side from the viewpoint of the handleability of the separator or the energy density of the battery. The thickness of the heat-resistant porous layer is preferably 1.0 μm or more and more preferably 1.6 μm or more, and preferably 8.0 μm or less and more preferably 7.0 μm or less as the total thickness of both sides, even when the heat-resistant porous layer is provided on only one side or both sides of the porous substrate.

In the separator of the present disclosure, the heat-resis-tant porous layer preferably has a mass per unit area of from 2.0 g/m² to 10.0 g/m² as a total of both sides. The mass of the heat-resistant porous layer is preferably 2.0 g/m² or more, and more preferably 3.0 g/m² or more as a total of both sides from the viewpoint of the heat resistance or the handleability of the separator, and is preferably 9.0 g/m² or less, and more preferably 8.0 g/m² or less from the viewpoint of the handleability of the separator or the energy density of the battery.

In the separator of the present disclosure, the porosity of the heat-resistant porous layer is preferably from 30% to 70%. The porosity of the heat-resistant porous layer is preferably 30% or more, and more preferably 40% or more from the viewpoint of the ion permeability of the separator. When small inorganic particles having an average primary particle diameter from 0.01 μm to less than 0.45 μm are used as the inorganic particles, the porosity of the heat-resistant porous layer is preferably 70% or less, more preferably 65% or less, and still more preferably 60% or less from the viewpoint of forming the heat-resistant porous layer into a denser structure to enhance the heat resistance. The porosity ε (%) of the heat-resistant porous layer is obtained by the following formula.

$$\varepsilon = \{1 - (Wa/da + Wb/db + Wc/dc + \ldots + Wn/dn)/t\} \times 100$$

Here, the constituent materials of the heat-resistant porous layer are a, b, c, . . . , and n, the masses of the constituent materials are Wa, Wb, Wc, . . . , and Wn (g/cm²), the true densities of the constituent materials are da, db, dc, . . . , and dn (g/cm³), and the thickness of the heat-resistant porous layer is t (cm).

In the separator of the present disclosure, peel strength between the porous substrate and the heat-resistant porous layer is preferably 5 N/m or more, more preferably 10 N/m or more, still more preferably 15 N/m or more, and still more preferably 20 N/m or more from the viewpoint of the adhesive strength of the separator to the electrode. The peel strength is preferably 75 N/m or less, more preferably 60 N/m or less, and still more preferably 50 N/m or less from the viewpoint of the ion permeability. When the separator of the present disclosure has the heat-resistant porous layer on both sides of the porous substrate, the peel strength between the porous substrate and the heat-resistant porous layer is preferably in the above range on both sides of the porous substrate.

Adhesive Layer

The adhesive layer in the separator of the present disclo-sure is provided on one side or both sides of a laminated body of a porous substrate and a heat-resistant porous layer, and the adhesive layer has a structure in which adhesive resin particles adhered to the laminated body. In the adhesive layer, a gas or a liquid can pass from one side to the other side by a gap existing between the adhesive resin particles. The structure in which the adhesive resin particles are adhering includes not only an aspect in which the resin retains the particle shape in the completed separator, but also an aspect in which the resin particles are partially melted by heat treatment or drying treatment in the completed separa-tor using the resin particles as the material of the adhesive layer and the particle shape is not retained.

Since the adhesive layer has a structure in which the adhesive resin particles are adhering to the heat-resistant porous layer or the porous substrate, interfacial fracture between the heat-resistant porous layer or the porous sub-strate and the adhesive layer hardly occurs. In addition, since the adhesive layer has a structure in which the adhesive resin particles are adhering to each other and are connected to each other, the adhesive layer has excellent toughness, and cohesive fracture of the adhesive layer hardly occurs.

The adhesive resin particles are particulate resins having adhesiveness to an electrode of a battery. As the adhesive resin particles, the type of resin may be selected according to the composition of the positive electrode or the negative electrode. The adhesive resin particles are preferably resin particles that are stable with respect to an electrolytic solution and are also electrochemically stable.

Examples of the adhesive resin particles may include particles containing a polyvinylidene fluoride type resin, a fluorine-based rubber, an acrylic type resin, a styrene-buta-diene copolymer, a homopolymer or a copolymer of a vinyl nitrile compound (acrylonitrile, methacrylonitrile, or the like), carboxymethyl cellulose, hydroxyalkyl cellulose, polyvinyl alcohol, polyvinyl butyral, polyvinyl pyrrolidone, polyether (polyethylene oxide, polypropylene oxide, or the like), or a mixture of two or more thereof. Among them, the particles containing the polyvinylidene fluoride type resin and/or the acrylic type resin are preferable from the view-point of excellent oxidation resistance.

Examples of the polyvinylidene fluoride type resin include a homopolymer of vinylidene fluoride (that is, polyvinylidene fluoride), a copolymer of vinylidene fluoride and other monomer (polyvinylidene fluoride copolymer), a mixture of polyvinylidene fluoride and the polyvinylidene fluoride copolymer. Examples of the monomer copolymer-izable with vinylidene fluoride include tetrafluoroethylene, hexafluoropropylene, trifluoroethylene, chlorotrifluoroethylene, trichloroethylene, vinyl fluoride, trifluoroperfluoropropyl ether, ethylene, (meth)acrylic acid, methyl (meth) acrylate, (meth)acrylate, vinyl acetate, vinyl chloride, acrylonitrile, and the like. These monomers may be used singly or in combination of two or more kinds thereof.

The polyvinylidene fluoride copolymer contained in the adhesive resin particles is preferably a copolymer having 50% by mol or more of constituent unit derived from vinylidene fluoride from the viewpoint of obtaining mechanical strength that can withstand pressurization and heating during the manufacturing of the battery.

As the polyvinylidene fluoride copolymer contained in the adhesive resin particles, a copolymer of vinylidene fluoride and tetrafluoroethylene, a copolymer of vinylidene fluoride and hexafluoropropylene, or a copolymer of vinylidene fluoride and trifluoroethylene is preferable, and the copolymer of vinylidene fluoride and hexafluoropropylene is more preferable. As the copolymer of vinylidene fluoride and hexafluoropropylene, a copolymer containing 0.1% by mol to 10% by mol (preferably 0.5% by mol to 5% by mol) of a constituent unit derived from hexafluoropropylene is preferable.

The weight average molecular weight of the adhesive resin (preferably, polyvinylidene fluoride or polyvinylidene fluoride copolymer) contained in the adhesive resin particles is preferably from 1,000 to 5,000,000, more preferably from 10,000 to 3,000,000, and still more preferably from 50,000 to 2,000,000.

Examples of the acrylic type resin contained in the adhesive resin particles include poly (meth)acrylic acid, poly (meth)acrylic acid salt, poly (meth)acrylic acid ester, crosslinked poly (meth)acrylic acid, crosslinked poly (meth) acrylic acid salt, and crosslinked poly (meth)acrylic acid ester, or the like, and modified acrylic type resins may be used. These may be used singly or in combination of two or more kinds thereof. The acrylic type resin may be used as a mixture of polyvinylidene fluoride and an acrylic type resin or a mixture of a polyvinylidene fluoride copolymer and an acrylic type resin.

As the adhesive resin particles, polyvinylidene fluoride particles, polyvinylidene fluoride copolymer particles, particles of a mixture of polyvinylidene fluoride and a polyvinylidene fluoride copolymer, particles of a mixture of polyvinylidene fluoride and an acrylic type resin, or particles of a mixture of polyvinylidene fluoride and an acrylic type resin are preferable. Here, as the polyvinylidene fluoride copolymer, a copolymer of vinylidene fluoride and tetrafluoroethylene, a copolymer of vinylidene fluoride and hexafluoropropylene, or a copolymer of vinylidene fluoride and trifluoroethylene is preferable.

From the viewpoint of oxidation resistance, the mixture of polyvinylidene fluoride and an acrylic type resin or the mixture of a polyvinylidene fluoride copolymer and an acrylic type resin constituting the adhesive resin particles preferably contains 20% by mass or more of polyvinylidene fluoride or the polyvinylidene fluoride copolymer.

As the adhesive resin particles, two or more kinds of adhesive resin particles may be used in combination.

From the viewpoint of adjusting the ion permeability of the adhesive layer, the adhesiveness of the adhesive layer to the electrode, the peel strength between the adhesive layer and the heat-resistant porous layer, and the handleability of the adhesive layer in a well-balanced manner, it is preferable to use a mixture of first adhesive resin particles including a polyvinylidene fluoride type resin, and second adhesive resin particles including an acrylic type resin. The first adhesive resin particles (hereinafter, also referred to as "resin particles F") are particles containing a polyvinylidene fluoride type resin in an amount of more than 50% by mass with respect to the total solid content. The second adhesive resin particles (hereinafter, also referred to as "resin particles A.") are particles containing an acrylic type resin in an amount of more than 50% by mass with respect to the total solid content.

Examples of the polyvinylidene fluoride type resin contained in the resin particles F include polyvinylidene fluoride, a polyvinylidene fluoride copolymer, and a mixture of polyvinylidene fluoride and a polyvinylidene fluoride copolymer, and preferred embodiments of these polymers are as described above. The resin particles F may contain other resins other than the polyvinylidene fluoride type resin.

The amount of the polyvinylidene fluoride type resin contained in the resin particles F is more than 50% by mass, preferably 70% by mass or more, more preferably 90% by mass or more, and still more preferably 100% by mass with respect to the total solid content of the resin particles F.

Examples of the acrylic type resin contained in the resin particles A include poly (meth)acrylic acid, poly (meth) acrylic acid salt, poly (meth)acrylic acid ester, crosslinked poly (meth)acrylic acid, crosslinked poly (meth)acrylic acid salt, crosslinked poly (meth)acrylic acid ester, or the like, and modified acrylic type resins may be used. These may be used singly or in combination of two or more kinds thereof. The resin particles A may contain a resin other than the acrylic type resin.

The amount of the acrylic type resin contained in the resin particles A is more than 50% by mass, preferably 70% by mass or more, more preferably 90% by mass or more, and still more preferably 100% by mass with respect to the total solid content of the resin particles A.

When the adhesive layer contains a mixture of the resin particles F and the resin particles A, the mass ratio of the resin particles F and the resin particles A contained in the adhesive layer may be adjusted according to the characteristics required for the adhesive layer. The mass ratio (resin particles F:resin particles A) of the resin particles F and the resin particles A contained in the adhesive layer is preferably from 50:50 to 90:10. The mass ratio of the resin particles F to the resin particles A is more preferably from 60:40 to 80:20.

The mixture of the resin particles F and the resin particles A is preferably a dispersion liquid in which the resin particles F and the resin particles A are dispersed in a dispersion medium as a coating liquid used for manufacturing the adhesive layer. The dispersion medium of the dispersion liquid is not particularly limited as long as it is a dispersion medium that does not dissolve the polyvinylidene fluoride type resin, the acrylic type resin, and the heat-resistant porous layer, but water is preferable from the viewpoint of handling safety. That is, the dispersion is preferably an aqueous dispersion in which the resin particles F and the resin particles A are dispersed in water. The mass ratio of the resin particles F and the resin particles A contained in the aqueous dispersion is preferably resin particles F:resin particles A=50:50 to 90:10 when the aqueous dispersion is used for manufacturing the adhesive layer. It is more preferable that resin particles F:resin particles A=60:40 to 80:20.

Examples of representative commercially available products of the aqueous dispersion in which the resin particles F and the resin particles A are dispersed in water include, for example, Aquatec FMA-12, Aquatec ARC, and Aquatec CRX manufactured by Arkema K. K.; TRD202A and the like manufactured by JSR Corporation.

The aqueous dispersion in which the resin particles F and the resin particles A are dispersed in water may be prepared by dispersing the resin particles F and the resin particles A in water, or may be prepared by mixing an aqueous dispersion in which the resin particles F are dispersed in water and an aqueous dispersion in which the resin particles A are dispersed in water.

As the aqueous dispersion in which the resin particles F are dispersed in water, a known aqueous dispersion containing a commercially available product can be used, or a known resin particle F containing a commercially available product can be dispersed in water and used. Typical commercially available products of the aqueous dispersion in which the resin particles F are dispersed in water include LBG 2200 LX, LATEX 32, and KYNAR WATERBORNE RC series (RC-10246, RC-10278, RC-10280, and the like) manufactured by Arkema KK; XPH 838 series, XPH 882 series, XPH 883 series, XPH 884 series, XPH 859 series, XPH 918 series manufactured by Solvay Specialty Polymers, and the like; PVDF aqueous dispersion manufactured by KUREHA CORPORATION; and the like.

As the aqueous dispersion in which the resin particles A are dispersed in water, a known aqueous dispersion containing a commercially available product can be used, or a known resin particle A containing a commercially available product can be dispersed in water and used. Typical commercially available products of the aqueous dispersion in which the resin particles A are dispersed in water include, for example, BM-120S manufactured by Zeon Corporation; Aqueous dispersion of acrylic particles manufactured by DIC Corporation; and the like.

The volume average particle diameter of the adhesive resin particles is preferably 0.01 μm or more, more preferably 0.03 μm or more, and still more preferably 0.05 μm or more from the viewpoint of forming a good porous structure, and is preferably 1.0 μm or less, more preferably 0.8 μm or less, and still more preferably 0.6 μm or less from the viewpoint of suppressing the thickness of the adhesive layer.

The adhesive layer may contain components other than the adhesive resin particles as long as the effects of the present disclosure are not impaired. In the adhesive layer, it is preferable that adhesive resin particles occupy 90% by mass or more of the total amount of the layer, and it is more preferable that adhesive resin particles occupy 95% by mass or more of the total amount of the layer. It is further preferable that the adhesive layer substantially contains only the adhesive resin particles.

The adhesive layer in the separator of the present disclosure may contain additives such as a dispersant such as a surfactant, a wetting agent, an antifoaming agent, and a pH adjusting agent.

When a resin particle dispersion for forming an adhesive layer is used, the dispersant is added to the resin particle dispersion for the purpose of improving dispersibility, coatability, or storage stability.

In the case of using the resin particle dispersion for forming the adhesive layer, the wetting agent, the defoaming agent, and the pH adjusting agent are added to the resin particle dispersion, for example, for the purpose of improving compatibility with the heat-resistant porous layer, suppressing air entrainment into the resin particle dispersion, or for the purpose of pH adjustment.

Examples of the surfactant contained in the adhesive layer include non-reactive anionic surfactants (for example, alkyl sulfate ester, polyoxyethylene alkyl ether sulfate ester salt, alkylbenzene sulfonate, alkylnaphthalene sulfonate, alkylsulfosuccinate, alkyldiphenyl ether disulfonate, naphthalenesulfonate formalin condensate, polyoxyethylene polycyclic phenyl ether sulfate, polyoxyethylene distyrene phenyl ether sulfate, fatty acid salt, alkyl phosphate, polyoxyethylene alkyl phenyl ether sulfate, or the like); non-reactive nonionic surfactants (for example, polyoxyethylene alkyl ether, polyoxyalkylene alkyl ether, polyoxyethylene polycyclic phenyl ether, polyoxyethylene distyrene phenyl ether, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene alkylamine, alkylalkanolamide, polyoxyethylene alkylphenyl ether, or the like); and so-called reactive surfactants in which an ethylenically unsaturated double bond is introduced into the chemical structure of a surfactant having a hydrophilic group and a lipophilic group.

Examples of the anionic surfactant which is a reactive surfactant include ethylenically unsaturated monomers having a group selected from a sulfonic acid group, a sulfonate group, a sulfate group, and salts thereof, and a compound having a sulfonic acid group or a group which is an ammonium salt or an alkali metal salt thereof (that is, an ammonium sulfonate group or an alkali metal sulfonate group). Specific examples of the anionic surfactant include alkyl allyl sulfosuccinate, polyoxyethylene alkyl propenyl phenyl ether sulfate, α-[1-[(allyloxy)methyl]-2-(nonylphenoxy)ethyl]-ω-polyoxyethylene sulfate, ammonium=α-sulfonato-ω-1-(allyloxymethyl)alkyloxypolyoxyethylene, styrene sulfonate, α-[2-[(allyloxy)-1-(alkyloxymethyl) ethyl]-ω-polyoxyethylene sulfate, and sulfate ester of polyoxyethylene polyoxybutylene (3-methyl-3-butenyl)ether.

Examples of the nonionic surfactant which is a reactive surfactant include α-[1-[(allyloxy)methyl]-2-(nonylphenoxy)ethyl]-ω-hydroxypolyoxyethylene, polyoxyethylene alkylpropenylphenyl ether, α-[2-[(allyloxy)-1-(alkyloxymethyl)ethyl]ethyl]-ω-hydroxypolyoxyethylene, and polyoxyethylene polyoxybutylene (3-methyl-3-butenyl)ether.

The surfactant is used singly or in combination of two or more kinds thereof.

In an embodiment of the separator of the present disclosure, the adhesive layer further contains a surfactant. The surfactant contained in the adhesive layer is preferably at least one selected from the group consisting of the non-reactive anionic surfactant, the non-reactive nonionic surfactant, the active anionic surfactant, and the reactive nonionic surfactant. Specific examples of each of the non-reactive anionic surfactant, the non-reactive nonionic surfactant, the reactive anionic surfactant, and the reactive nonionic surfactant include the specific examples described above as the surfactant contained in the resin particle dispersion for forming the adhesive layer. When the adhesive layer further contains a surfactant, the mass ratio of the surfactant with respect to the total mass of the adhesive layer is preferably from 0.1% by mass to 10% by mass, and more preferably from 1% by mass to 8% by mass.

The adhesive layer can be formed using the resin particle dispersion for forming the adhesive layer. For example, the adhesive layer can be formed by application or the like of a resin particle dispersion liquid containing adhesive resin particles and, if necessary, components other than the adhesive resin particles to at least one of the porous substrate and the heat-resistant porous layer.

The weight of the adhesive layer is preferably 0.2 g/m$^2$ or more, more preferably 0.25 g/m$^2$ or more, and still more preferably 0.3 g/m$^2$ or more per one side from the viewpoint of adhesiveness to an electrode, and is preferably 2.0 g/m$^2$ or less, more preferably 1.8 g/m² or less, and still more preferably 1.6 g/m² or less per one side from the viewpoint of the ion permeability, the handleability of the separator, or the energy density of the battery.

The coverage of the adhesive resin particles in the adhesive layer (area ratio at which the particles cover the plane) is preferably 60% or more, more preferably 70% or more, and still more preferably 80% or more with respect to the area of the separator in plan view. The coverage of the adhesive resin particles in the adhesive layer is obtained by imaging the surface of the separator with the scanning electron microscope in a direction perpendicular to the surface, randomly specifying a rectangular area with 10 points, obtaining coverage of each region, and calculating an average value of 10 points.

Characteristics of Separator

The thickness of the separator of the present disclosure is preferably 8.0 μm or more, and more preferably 9.0 μm or more from the viewpoint of the mechanical strength of the separator, and is preferably 20.0 μm or less, and more preferably 15.0 μm or less from the viewpoint of the energy density of the battery.

The puncture strength of the separator of the present disclosure is preferably from 150 g to 1000 g, and more preferably from 200 g to 600 g from the viewpoint of the mechanical strength of the separator or the short circuit resistance of the battery. The method of measuring the puncture strength of the separator is the same as the method of measuring the puncture strength of the porous substrate.

The porosity of the separator of the present disclosure is preferably from 30% to 60% from the viewpoint of the adhesiveness to the electrode, the handleability of the separator, the ion permeability, or the mechanical strength.

The membrane resistance of the separator of the present disclosure is preferably from 0.5 ohm·cm² to 10 ohm·cm², and more preferably from 1 ohm·cm² to 8 ohm·cm² from the viewpoint of load characteristics of the battery.

The Gurley value (JIS P8117: 2009) of the separator of the present disclosure is preferably from 50 seconds/100 mL to 800 seconds/100 mL, more preferably from 80 seconds/100 mL to 500 seconds/100 mL, and still more preferably from 100 seconds/100 mL to 400 seconds/100 mL from the viewpoint of a balance between the mechanical strength and the ion permeability.

In the separator of the present disclosure, the difference between the Gurley value of the separator and the Gurley value of the porous substrate is preferably from 20 seconds/100 mL to 300 seconds/100 mL from the viewpoint of the ion permeability. The difference between the Gurley value of the separator and the Gurley value of the porous substrate is more preferably 200 seconds/100 mL or less, and still more preferably 150 seconds/100 mL or less.

The tensile strength of the separator of the present disclosure in the MD direction is preferably 500 kgf/cm² or more, more preferably 600 kgf/cm² or more, and still more preferably 700 kgf/cm² or more from the viewpoint of the mechanical strength or the handleability of the separator (fixability of the adhesive layer). From the above viewpoint, the tensile strength in the MD direction is preferably as high as possible, but is usually 3000 kgf/cm² or less.

The tensile strength of the separator of the present disclosure in the TD direction is preferably 500 kgf/cm² or more, more preferably 600 kgf/cm² or more, and still more preferably 700 kgf/cm² or more from the viewpoint of the mechanical strength or the handleability of the separator (fixability of the adhesive layer). From the above viewpoint, the tensile strength in the TD direction is preferably as high as possible, but is usually 3000 kgf/cm² or less.

The amount of water (based on mass) contained in the separator of the present disclosure is preferably 1000 ppm or less. With a smaller amount of water in the separator, a reaction between an electrolytic solution and water can be suppressed, and generation of gas in a battery can be suppressed to improve the cycle characteristics of the battery in a case where the battery is formed. The amount of water contained in the separator is more preferably 800 ppm or less, and still more preferably 500 ppm or less from this viewpoint.

The separator of the present disclosure has a shrinkage ratio in an MD direction of preferably 6% or less, more preferably 5.5% or less when heat-treated at 130° C. for 1 hour.

The separator of the present disclosure has a shrinkage ratio in a TD direction of preferably 6% or less, more preferably 5.5% or less when heat-treated at 130° C. for 1 hour.

The separator of the present disclosure has a shrinkage ratio in an MD direction of preferably 10% or less, more preferably 9.5% or less when heat-treated at 150° C. for 1 hour.

The separator of the present disclosure has a shrinkage ratio in a TD direction of preferably 10% or less, more preferably 9.5% or less when heat-treated at 150° C. for 1 hour.

Further, the separator of the present disclosure is more preferable to exhibit a heat shrinkage ratio in an MD direction and in a TD direction of 10% or less when heat-treated at 150° C. for 1 hour.

A shrinkage ratio when the separator is heat-treated at 130° C. or 150° C. for 1 hour is obtained by the following measurement method.

The separator was cut out into a size of 100 mm in the MD direction×100 mm in the TD direction, and a reference line having a length of 70 mm was drawn in each of the MD direction and the TD direction so as to pass through the center of the sample of the separator to obtain a test piece. The test piece was disposed between two sheets of A4 size paper, and then left standing in an oven at 130° C., or in an oven at 150° C., for 1 hour. The lengths of the test pieces in the MD direction and the TD direction before and after the heat treatment were measured, the heat shrinkage ratio was calculated from the following formula, the above operation was further performed twice, and the heat shrinkage ratios of three test pieces were averaged to obtain the heat shrinkage ratio of the separator.

$$\text{Heat shrinkage ratio (\%)} = \{(\text{length in } MD \text{ direction before heat treatment} - \text{length in } MD \text{ direction after heat treatment}) \div \text{length in } MD \text{ direction before heat treatment}\} \times 100$$

$$\text{Heat shrinkage ratio (\%)} = \{(\text{length in } TD \text{ direction before heat treatment} - \text{length in } TD \text{ direction after heat treatment}) \div \text{length in } TD \text{ direction before heat treatment}\} \times 100$$

The shrinkage ratio when the separator of the present disclosure is heat-treated can be controlled by, for example, the content of inorganic particles in the heat-resistant porous layer, the thickness of the heat-resistant porous layer, the porosity of the heat-resistant porous layer, and the like.

Method of Manufacturing Separator

The separator of the present disclosure is manufactured, for example, by the following manufacturing method A or manufacturing method B. In the manufacturing method A and the manufacturing method B, the method of forming the heat-resistant porous layer may be a wet coating method or a dry coating method.

The manufacturing method B may be any of the following forms B-1 to B-7. Forms B-1 to B-4 are forms in which the heat-resistant porous layer is formed by the wet coating method. Forms B-5 to B-7 are forms in which the heat-resistant porous layer is formed by the dry coating method.

In the present disclosure, the wet coating method is a method of solidifying a coating layer in a coagulation liquid, and the dry coating method is a method of drying a coating layer to solidify the coating layer.

(a) Manufacturing Method a (Discontinuous Manufacturing Method):

A heat-resistant porous layer is formed on the porous substrate unwound from the roll to obtain the laminated body of the porous substrate and the heat-resistant porous layer, and then the laminated body is once wound around another roll. Next, the adhesive layer is formed on the laminated body unwound from the roll to obtain the separator, and the obtained separator is wound around another roll.

(b) Manufacturing Method B (Continuous Manufacturing Method):

The heat-resistant porous layer and the adhesive layer are continuously or simultaneously formed on the porous substrate unwound from the roll, and the obtained separator is wound around another roll.

Next, the form by the wet coating method will be described.

Form B-1:

A heat-resistant porous layer forming coating liquid is applied onto a porous substrate, the resultant product is immersed in a coagulation liquid to solidify the coating layer and pulled out of the coagulation liquid, and the resultant product is washed with water and dried. Then an adhesive resin particle dispersion liquid is applied onto the resultant product and dried.

Form B-2:

A heat-resistant porous layer forming coating liquid is applied onto a porous substrate, the resultant product is immersed in a coagulation liquid to solidify the coating layer and pulled out of the coagulation liquid, and the resultant product is washed with water. Then an adhesive resin particle dispersion liquid is applied onto the resultant product and dried.

Form B-3:

A heat-resistant porous layer forming coating liquid and an adhesive resin particle dispersion liquid are simultaneously applied in two layers onto a porous substrate. The resultant product is immersed in a coagulation liquid to solidify the former coating layer and pulled out of the coagulation liquid, and the resultant product is washed with water and dried.

Form B-4:

A heat-resistant porous layer forming coating liquid is applied onto a porous substrate, the resultant product is immersed in a coagulation liquid to solidify the coating layer and pulled out of the coagulation liquid. Washing with water and adhesion of an adhesive resin particles are performed by transporting the resultant product in a water bath. The resultant product is pulled out of the water bath and dried.

Next, the form by the dry coating method will be described.

Form B-5:

A heat-resistant porous layer forming coating liquid is applied onto a porous substrate, and dried. Then an adhesive resin particle dispersion liquid is applied onto the resultant product, and dried.

Form B-6:

A heat-resistant porous layer forming coating liquid is applied onto a porous substrate. Then an adhesive resin particle dispersion liquid is applied onto the resultant product, and dried.

Form B-7:

A heat-resistant porous layer forming coating liquid and an adhesive resin particle dispersion liquid are simultaneously applied in two layers onto a porous substrate, and dried.

Hereinafter, details of the processes included in the manufacturing method will be described using the manufacturing method B of Form B-1 as an example.

In the manufacturing method B of Form B-1, the heat-resistant porous layer is formed on at least one side of the porous substrate by the wet coating method to obtain the laminated body of the porous substrate and the heat-resistant porous layer, and then the adhesive layer is formed on at least one side of the laminated body by the dry coating method. The manufacturing method B of Form B-1 includes the following processes (1) to (7), and the processes (1) to (7) are sequentially performed.

Process (1): Preparation of Coating Liquid for Forming Heat-Resistant Porous Layer The heat-resistant porous layer forming coating liquid (hereinafter, the coating liquid is referred to as a "coating liquid" in the description of the manufacturing method) is prepared by dissolving or dispersing a binder resin and inorganic particles in a solvent. In the coating liquid, other resins other than the binder resin or other components other than the resin are dissolved or dispersed as necessary.

A solvent used for preparing the coating liquid includes a solvent that dissolves the binder (hereinafter, also referred to as "good solvent"). Examples of the good solvent include a polar amide solvent such as N-methylpyrrolidone, dimethylacetamide, or dimethylformamide.

The solvent used for preparing the coating liquid preferably contains a phase separation agent that induces phase separation from the viewpoint of forming a porous layer having a favorable porous structure. Therefore, the solvent used for preparing the coating liquid is preferably a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

The solvent used for preparing the coating liquid is preferably a mixed solvent of a good solvent and a phase separation agent, containing 60% by mass or more of the good solvent and 40% by mass or less of the phase separation agent from the viewpoint of forming a favorable porous structure.

The binder resin concentration of the coating liquid is preferably from 1% by mass to 20% by mass from the viewpoint of forming a favorable porous structure.

Process (2): Preparation of Adhesive Resin Particle Dispersion

The adhesive resin particle dispersion is prepared by dispersing the adhesive resin particles in water. The surfactant may be added to the adhesive resin particle dispersion in order to enhance the dispersibility of the adhesive resin particles in water. The adhesive resin particle dispersion may be a commercially available product or a diluent of a commercially available product.

The concentration of the adhesive resin particles in the adhesive resin particle dispersion is preferably from 1% by mass to 60% by mass from the viewpoint of the coating suitability.

Process (3): Applying of Coating Liquid

The coating liquid is applied to at least one side of the porous substrate to form the coating layer on the porous substrate. Examples of the method of applying the coating liquid to the porous substrate include a knife coating method, a Meyer bar coating method, a die coating method, a reverse roll coating method, a roll coating method, a gravure coating method, a screen printing method, an inkjet method, and a spray method. When the heat-resistant porous layer is formed on both sides of the porous substrate, it is preferable to simultaneously apply the coating liquid to both sides of the porous substrate from the viewpoint of productivity.

Operation (4): Solidification of Coating Layer

The porous substrate on which the coating layer is formed is immersed in the coagulation liquid to solidify the binder resin while inducing phase separation in the coating layer, thereby forming the heat-resistant porous layer. Thus, the laminated body including the porous substrate and the heat-resistant porous layer is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure and productivity. The temperature of the coagulation liquid is, for example, from 20° C. to 50° C.

Process (5): Washing and Drying of Coating Layer

The laminated body is pulled up from the coagulation liquid and washed with water. The solidified liquid is removed from the laminated body by washing with water. Further, water is removed from the laminated body by drying. The water washing is performed, for example, by conveying the laminated body in a water washing bath. The drying is performed, for example, by conveying the laminated body in the high-temperature environment, applying air to the laminated body, bringing the laminated body into contact with a heat roll, or the like. The drying temperature is preferably from 40° C. to 80° C.

Operation (6): Applying of Adhesive Resin Particle Dispersion

The adhesive resin particle dispersion is applied to at least one side of the laminated body. Examples of the method of applying an adhesive resin particle dispersion include the knife coating method, the gravure coating method, the Meyer bar coating method, the die coating method, the reverse roll coating method, the roll coating method, the screen printing method, the inkjet method, and the spray method.

Process (7): Drying of Adhesive Resin Particle Dispersion

The adhesive resin particle dispersion on the laminated body is dried to attach the adhesive resin particles to the surface of the laminated body. The drying is performed, for example, by conveying the laminated body in the high-temperature environment, applying air to the laminated body, or the like. The drying temperature is preferably from 40° C. to 100° C.

The manufacturing method A for manufacturing a first separator or the manufacturing method B of Form B-2 to Form B-4 can be performed by partially omitting or changing the above processes (1) to (7).

The manufacturing method A for manufacturing a second separator or the manufacturing method B of Form B-2 to Form B-7 can be performed by partially omitting or changing the above processes (1) to (7).

<Non-Aqueous Secondary Battery>

A non-aqueous secondary battery of the present disclosure is a non-aqueous secondary battery that obtains an electromotive force by doping/dedoping lithium, and includes a positive electrode, a negative electrode, and a separator for a non-aqueous secondary battery of the present disclosure. The doping means occlusion, support, adsorption, or insertion, and means a phenomenon that lithium ions enter an active material of an electrode such as a positive electrode.

The non-aqueous secondary battery of the present disclosure has a structure in which, for example, a battery element in which a negative electrode and a positive electrode face each other with a separator interposed therebetween is enclosed in an exterior material together with an electrolytic solution. The non-aqueous secondary battery of the present disclosure is suitable for a non-aqueous electrolyte secondary battery, particularly for a lithium ion secondary battery.

The non-aqueous secondary battery of the present disclosure is excellent in battery productivity and battery cycle characteristics (capacity retention rate) because the separator of the present disclosure is excellent in the adhesion to the electrode.

Hereinafter, aspect examples of the positive electrode, negative electrode, electrolyte solution, and exterior material included in the non-aqueous secondary battery according to the present disclosure will be described.

Examples of an embodiment of the positive electrode include a structure in which an active material layer containing a positive electrode active material and a binder resin is formed on a current collector. The active material layer may further contain a conductive auxiliary agent. Examples of the positive electrode active material include a lithium-containing transition metal oxide, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$. Examples of the binder resin include a polyvinylidene fluoride type resin, and a styrene-butadiene copolymer. Examples of the conductive auxiliary agent include carbon materials such as acetylene black, Ketjen black, and graphite powder. Examples of the current collector include an aluminum foil, a titanium foil, and a stainless steel foil, each having a thickness of from 5 μm to 20 μm.

In the non-aqueous secondary battery according to the present disclosure, when the adhesive layer of the separator according to the present disclosure includes a polyvinylidene fluoride type resin, since a polyvinylidene fluoride type resin has excellent oxidation resistance, when the adhesive layer is disposed at the side of the positive electrode of the non-aqueous secondary battery, a positive electrode active material that can be operated at a high voltage of 4.2 V or more, such as $LiMn_{1/2}Ni_{1/2}O_2$ and $LiCo_{1/3}Mn_{1/3}Ni_{1/3}O_2$, can be easily applicable.

Examples of an embodiment of the negative electrode include a structure in which an active material layer containing a negative electrode active material and a binder resin is formed on a current collector. The active material layer may further contain a conductive auxiliary agent. Examples of the negative electrode active material include materials capable of electrochemically occluding lithium. Specific examples thereof include carbon materials; and alloys of lithium in combination with silicon, tin, aluminum; wood's alloy, or the like. Examples of the binder resin include a polyvinylidene fluoride type resin and a styrene-butadiene copolymer. Examples of the conductive auxiliary agent include carbon materials such as acetylene black, Ketjen black, and graphite powder. Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination. As the electrolyte solution, a solution is preferred, which is obtained by mixing a cyclic carbonate and a chain carbonate at a mass ratio (cyclic carbonate:chain carbonate) of from 20:80 to 40:60, and dissolving a lithium salt therein to give a concentration of from 0.5 mol/L to 1.5 mol/L.

Examples of the exterior material include a metal can and an aluminum laminated film pack. The shape of the battery may be a square shape, a cylindrical shape, a coin shape, and the like, but the separator of the present disclosure is suitable for any one of these shapes.

Examples of a method of producing the non-aqueous secondary battery of the present disclosure include a production method including impregnating a separator with an electrolytic solution and subjecting the separator to a heat press treatment (referred to as "wet heat press" in the present disclosure) to bond the separator to an electrode; and a production method including subjecting a separator to a heat press treatment without causing the separator to be impregnated with an electrolytic solution (referred to as "dry heat press" in the present disclosure) to bond the separator to an electrode.

The non-aqueous secondary battery of the present disclosure can be produced by disposing the separator of the present disclosure between a positive electrode and a negative electrode, winding the resulting product in a length direction to produce a wound body, and then performing, for example, the following production methods 1 to 3 using this wound body. The same applies to a case of using an element produced by a method of stacking at least one layer of a positive electrode, at least one layer of a separator, and at least one layer of a negative electrode in this order (a so-called stack method) instead of the wound body.

Production method 1: The wound body is dry-heat-pressed to bond the electrodes to the separator. Thereafter, the resulting product is housed in an exterior material (for example, an aluminum laminated film pack. The same applies hereinafter), and an electrolytic solution is injected therein. The wound body is further wet-heat-pressed from the outside of the exterior material to perform adhesion between the electrodes and the separator and sealing of the exterior material.

Production method 2: The wound body is housed in an exterior material, and an electrolytic solution is injected therein. The wound body is wet-heat-pressed from the outside of the exterior material to perform adhesion between the electrodes and the separator and sealing of the exterior material.

Production method 3: The wound body is dry-heat-pressed to bond the electrodes to the separator. Thereafter, the resulting product is housed in an exterior material, and an electrolytic solution is injected therein to perform sealing of the exterior material.

As conditions of the hot pressing in the manufacturing methods 1 to 3, the press temperature is preferably from 60° C. to 120° C., and more preferably from 70° C. to 100° C., and the press pressure is preferably from 0.5 kg to 90 kg as a load per 1 $cm^2$ of the electrode in each of the dry heat press and the wet heat press. The pressing time is preferably adjusted according to the pressing temperature and the pressing pressure, and is adjusted, for example, in the range of from 0.1 minutes to 60 minutes.

In the manufacturing method 1 or 3, room-temperature pressing (pressurization at room temperature) may be performed on a wound body before dry heat pressing to temporarily bond the wound body. In the manufacturing method 2, the wound body may be temporarily bonded by room-temperature pressing before the wound body is housed in the exterior material.

EXAMPLES

Hereinafter, the separator and the non-aqueous secondary battery of the present disclosure will be described more specifically with reference to Examples. Materials, used amounts, ratios, treatment procedures, and the like illustrated in the following Examples can be changed, if appropriate without departing from the spirit of the present disclosure. Therefore, the range of the separator and the non-aqueous secondary battery of the present disclosure should not be construed as being limited by the specific examples described below.

<Measurement Method and Evaluation Method>

The measurement methods and evaluation methods applied in the examples of the invention and comparative examples are as follows.

[Average Primary Particle Diameter of Inorganic Particles]

The inorganic particles before addition to the coating liquid for forming a heat-resistant porous layer were used as a sample, and the major axes of 100 randomly selected particles were measured by observation with a scanning electron microscope (SEM). An average value thereof was calculated and defined as the average primary particle diameter (μm) of the inorganic particles. The magnification of the SEM was from 50,000 to 300,000. In the case of using the inorganic particles taken out from the separator as a sample, the inorganic particles were taken out by the method of taking out the inorganic particles from the separator described in the item of explanation of the average primary particle diameter of the inorganic particles. The average primary particle diameter of the extracted inorganic particles was measured by the above-described method.

[Thicknesses of Porous Substrate and Separator]

Each of the thicknesses (μm) of the porous substrate and the separator was determined by measuring thicknesses at 20 points with a contact-type thickness gauge (Mitutoyo Corporation, LITEMATIC VL-50) and averaging the measured values. As a measuring terminal, a cylindrical terminal having a diameter of 5 mm was used, and adjustment was performed such that a load of 0.01 N was applied during the measurement.

[Thickness of Heat-Resistant Porous Layer]

The thickness (total on both sides, μm) of the heat-resistant porous layer was obtained by subtracting the thickness (μm) of the porous substrate from the thickness (μm) of the laminated body including the porous substrate and the two-layer heat-resistant porous layers provided on both sides of the porous substrate. The thickness of one side of the heat-resistant porous layer was obtained by dividing the thickness (total of both sides) of the heat-resistant porous layer by 2.

[Basis Weight]

A basis weight (mass per m², g/m²) was obtained by cutting a sample into 10 cm×30 cm, measuring the mass, and dividing the mass by the area.

[Coating Amount of Each Layer]

The coating amount (g/m²) of each layer was obtained by subtracting the basis weight (g/m²) before the layer formation from the basis weight (g/m²) after the layer formation.

[Gurley Value]

The Gurley value (seconds/100 mL) of each of the porous substrate and the separator was measured according to JIS P8117: 2009 using a Gurley type densometer (Toyo Seiki Seisaku-sho, Ltd., G-B2C). In the following table, a value obtained by subtracting the Gurley value of the porous substrate from the Gurley value of the separator is referred to as a Gurley difference (seconds/100 mL).

[Porosity of Porous Substrate]

The porosity ε (%) of the porous substrate was obtained by the following formula.

$$\varepsilon = \{1 - Ws/(ds \cdot t)\} \times 100$$

Ws: basis weight of porous substrate (g/m²), ds: true density of porous substrate (g/cm³), t: thickness of porous substrate (cm).

[Porosity of Heat-Resistant Porous Layer]

The porosity ε (%) of the heat-resistant porous layer was obtained by the following formula.

$$\varepsilon = \{1 - (Wa/da + Wb/db + Wc/dc + \ldots + Wn/dn)/t\} \times 100$$

Here, the constituent materials of the heat-resistant porous layer are a, b, c, . . . , and n, the masses of the constituent materials are Wa, Wb, Wc, . . . , and Wn (g/cm²), the true densities of the constituent materials are da, db, dc, . . . , and dn (g/cm³), and the thickness of the heat-resistant porous layer is t (cm).

[Heat Shrinkage Ratio]

The separator was cut out into a size of 100 mm in the MD direction×100 mm in the TD direction, and a reference line having a length of 70 mm was drawn in each of the MD direction and the TD direction so as to pass through the center of the sample of the separator to obtain a test piece. The test piece was disposed between two sheets of A4 size paper, and then left standing in an oven at 130° C., or in an oven at 150° C., for 1 hour. The lengths of the test pieces in the MD direction and the TD direction before and after the heat treatment were measured, the heat shrinkage ratio was calculated from the following formula, the above operation was further performed twice, and the heat shrinkage ratios of three test pieces were averaged to obtain the heat shrinkage ratio of the separator.

Heat shrinkage ratio (%)={(length in MD direction before heat treatment−length in MD direction after heat treatment)÷length in MD direction before heat treatment}×100

Heat shrinkage ratio (%)={(length in TD direction before heat treatment−length in TD direction after heat treatment)÷length in TD direction before heat treatment}×100

[Peel Strength Between Porous Substrate and Heat-Resistant Porous Layer]

A T-shaped peel test was performed on the separator. Specifically, a pressure-sensitive adhesive tape (Manufactured by 3M Company (Korea), product number: 550, width: 12 mm) was attached to one side of the separator (when the pressure-sensitive adhesive tape was attached, the length direction of the pressure-sensitive adhesive tape was matched with the MD direction of the separator), and the separator was cut out together with the pressure-sensitive adhesive tape into a size of 12 mm in the TD direction and 70 mm in the MD direction. The pressure-sensitive adhesive tape was slightly peeled off together with the adhesive layer and the heat-resistant porous layer immediately below. Two separated ends were held by Tensilon (Orientec Co., Ltd., RTC-1210A), and a T-peel test was performed. Note that the pressure-sensitive adhesive tape was used as a support for peeling off the adhesive layer and the heat-resistant porous layer from the porous substrate. The tensile speed of the T-peel test was 20 mm/min. A load (N) from 10 mm to 40 mm after start of measurement was sampled at 0.4 mm intervals. An average thereof was calculated and converted into a load per 10 mm width (N/10 mm).

[Adhesive Strength Between Electrode and Separator]

97 g of lithium cobalt oxide as a positive electrode active material, 1.5 g of acetylene black as a conduction aid, 1.5 g of polyvinylidene fluoride as a binder, and an appropriate amount of N-methylpyrrolidone were stirred and mixed by a double arm mixer to prepare a slurry for a positive electrode. The slurry for the positive electrode was applied to one side of an aluminum foil having a thickness of 20 μm, dried, and then pressed to obtain a positive electrode (single-sided coating, basis weight 20 mg/cm², density 4.0 g/cm³) having a positive electrode active material layer.

The positive electrode obtained above was cut into a size of 15 mm in width and 70 mm in length, the separator was cut into a size of 18 mm in the TD direction and 75 mm in the MD direction, and an aluminum foil having a thickness of 20 μm was cut into a size of 15 mm in width and 70 mm in length. A laminated body was produced by stacking the positive electrode/separator/aluminum foil in this order, and the laminated body was housed in an aluminum laminate film pack. Next, the inside of the pack was brought into a vacuum state using a vacuum sealer, and the laminated body was hot-pressed (Temperature: 85° C., load: 1 MPa, pressing time: 30 seconds) together with the pack using a hot press machine to bond the positive electrode and the separator. Thereafter, the pack was opened, the laminated body was taken out, and the aluminum foil was removed from the laminated body to obtain a test piece.

The separator of the test piece was fixed to a lower chuck of Tensilon (A&D Company, STB-1225S). At this time, the separator was fixed to tensilon so that the length direction of the test piece (that is, the MD direction of the separator) was a gravity direction. The positive electrode was peeled off from the separator by about 2 cm from the lower end, the end was fixed to the upper chuck, and a 1800 peeling test was performed. The tensile speed in the 1800 peel test was set to 100 mm/min, and a load (N) from 10 mm to 40 mm after the start of the measurement was taken at 0.4 mm intervals, so the average thereof was calculated. Further, the load of the three test pieces was averaged to determine the adhesive strength (N/15 mm) between the electrode and the separator. In Tables 1 and 2, the adhesive strength of the separator of Comparative Example 1 is set to a reference value of 100, and the adhesive strength of each separator of Examples and Comparative Examples is shown in percentage.

[Measurement of Thermal Conductivity]

A positive electrode (double-sided coating, basis weight: 40 mg/cm$^2$, density: 4.0 g/cm$^3$) was produced in the same manner as in the manufacturing of the positive electrode in the above (adhesive strength between the electrode and the separator).

300 g of artificial graphite as a negative electrode active material, 7.5 g of a water-soluble dispersion containing 40% by mass of a modified product of a styrene-butadiene copolymer as a binder, 3 g of carboxymethyl cellulose as a thickener, and an appropriate amount of water were stirred and mixed by a double arm mixer to prepare a slurry for a negative electrode. The slurry for the negative electrode was applied to both sides of a copper foil having a thickness of 10 μm, dried, and then pressed to obtain the negative electrode (double-sided coating, basis weight: 20 mg/cm$^2$, density: 1.7 g/cm$^3$) having the negative electrode active material layer.

The separator cut to a size of 150 mm×75 mm and the positive electrode and the negative electrode were stacked so as to be a separator/negative electrode/separator/positive electrode/separator/negative electrode/separator/positive electrode/separator to prepare a test piece. In accordance with the nonstationary heat ray method described in JIS R2616: 2001, the thermal conductivity (W/m·K) was measured using a thermal conductivity measurement device (QTM-500 manufactured by Kyoto Electronics Manufacturing Co., Ltd.) under the conditions of a temperature raising range of 30° C. to 120° C. and a temperature raising rate of 5° C./min. Based on the thermal conductivity, the thermal conductivity of the test piece was evaluated according to the following evaluation criteria.

<Evaluation Criteria>

A: Thermal conductivity is 7.0 W/m·K or more.

B: Thermal conductivity is from 6.5 W/m·K to less than 7.0 W/m·K.

C: Thermal conductivity is from 6.0 W/m·K to less than 6.5 W/m·K.

D: Thermal conductivity is less than 6.0 W/m·K.

[Production Yield]

A positive electrode/a negative electrode (both sides were coated) was produced in the same manner as in the production of the positive electrode and the negative electrode in the [Measurement of Thermal Conductivity].

Two separators (width: 108 mm) were prepared and stacked, and one end in the MD direction was wound around a stainless steel winding core. A positive electrode (width: 106.5 mm) to which a lead tab was welded was sandwiched between two separators, and a negative electrode (width: 107 mm) to which a lead tab was welded was disposed on one of the separators and wound to continuously produce 50 wound bodies. The obtained wound body was subjected to room-temperature pressing (load: 1 MPa, press time: 30 seconds) and then to hot pressing (temperature: 85° C., load: 1 MPa, pressing time: 30 seconds) to obtain a flat plate-shaped battery element.

Immediately after the hot pressing and after a lapse of 1 hour from the hot pressing, the thickness of the battery element having a flat plate shape was measured, and a case where the change in thickness was 3% or less was determined to be accepted, and a case where the change in thickness was more than 3% was determined to be rejected. The number ratio (%) of the accepted battery elements was calculated, and evaluated according to the following evaluation criteria.

<Evaluation Criteria>

A: The number ratio of accepted samples is 100% (0 rejected samples).

B: The number ratio of the accepted samples is from 95% to less than 100% (one or two rejected samples).

C: The number ratio of the accepted samples is from 90% to less than 95% (3 to 5 rejected samples).

[Battery Swelling]

50 battery elements were produced in the same manner as in the [production yield]. The battery element was housed in an aluminum laminate film pack, and the battery element was immersed in an electrolytic solution and sealed using a vacuum sealer. As the electrolytic solution, 1 mol/L LiPF$_6$-ethylene carbonate:ethyl methyl carbonate (mass ratio 3:7) was used. Thereafter, the aluminum laminate film pack containing the battery element and the electrolytic solution was hot-pressed (temperature: 85° C., load: 1 MPa, pressing time: 10 seconds) by a hot-pressing machine to obtain 50 secondary batteries for testing.

50 test secondary batteries were charged and discharged for 100 cycles at a temperature of 25° C. The charging was constant current constant voltage charging at 0.7 C and 4.2 V, and the discharging was constant current discharging at 0.5 C and 2.75 V cutoff.

Before the charging and discharging and after 100 cycles of charging and discharging, the thickness of the test secondary battery was measured, and a case where the change in thickness was 8% or less was determined to be accepted, and a case where the change in thickness was more than 8% was determined to be rejected. The number ratio (%) of the accepted battery elements was calculated, and evaluated according to the following evaluation criteria.

<Evaluation Criteria>

A: The number ratio of accepted samples is 100% (0 rejected samples).

B: The number ratio of the accepted samples is from 95% to less than 100% (one or two rejected samples).

C: The number ratio of the accepted samples is less than 95% (3 or more rejected samples).

[Collision Test]

50 battery elements were produced in the same manner as in the [production yield]. 50 test secondary batteries were charged at a constant current of 1 C at a temperature of 25° C. to reach 4.2 V, and then charged at a constant voltage of 4.2 V for 3 hours in total. In accordance with UL1642 standard defined by underwriters laboratories (UL) Inc. of the United States, a stainless steel bar having a diameter of 15.8 mm was set at the center of the upper surface of the laminate cell, and the collision test was performed in which a weight of 9.1 kg was dropped from a height of 61 f 2.5 cm onto the stainless steel bar. As a result of the collision test, a case where there was no gas ejection and ignition and the voltage of the laminate cell dropped within 1 second after the collision was determined to be accepted, and a case where there was gas ejection and ignition was determined to be rejected. The number ratio (%) of the accepted battery elements was calculated, and evaluated according to the following evaluation criteria.

<Evaluation Criteria>

A: The number ratio of accepted samples is 100% (0 rejected samples).

B: The number ratio of the accepted samples is from 95% to less than 100% (one or two rejected samples).

C: The number ratio of the accepted samples is less than 95% (3 or more rejected samples).

Example 1

Meta-aramid (polymetaphenylene isophthalamide, CONEX (registered trademark) manufactured by TEIJIN CORPORATION) and magnesium hydroxide particles (average primary particle diameter: 0.30 μm) were stirred and mixed in a mixed solvent of dimethylacetamide (DMAc) and tripropylene glycol (TPG) (DMAc:TPG=80:20 [mass ratio]) so that the mass ratio of both was 20:80 and a concentration of the meta-aramid was 5% by mass, thereby obtaining a coating liquid.

An aqueous dispersion (solid content concentration: 7% by mass) in which polyvinylidene fluoride resin particles (melting point: 140° C., volume average particle diameter: 0.2 μm; PVDF particles) and acrylic resin particles (glass transition temperature: 59° C., volume average particle diameter: 0.5 μm) were dispersed in water at a mass ratio of 70:30 was prepared.

An appropriate amount of the coating liquid was placed on a pair of Meyer bars, and a polyethylene microporous membrane (thickness: 6 μm, porosity: 39%, Gurley value: 100 seconds/100 mL; In Table 1, it was indicated as "PE". The same applies hereinafter) was passed between the Meyer bars, and an equal amount of the coating liquid was coated to both sides. This was immersed in a coagulation liquid (DMAc:TPG:water=32:8:60 [mass ratio], liquid temperature 40° C.) to solidify a coating layer, then washed in a water washing tank having a water temperature of 40° C., and dried to form a heat-resistant porous layer having a coating amount of 3.0 g/m². Subsequently, this was passed between a pair of bar coaters on which an appropriate amount of the aqueous dispersion was placed, and an equal amount of the aqueous dispersion was applied to both sides and dried. In this way, a separator in which a heat-resistant porous layer and an adhesive layer were formed on both sides of a polyethylene microporous membrane was obtained.

The configuration, characteristics, and battery evaluation results of the separator of Example 1 are shown in Table 1 below. Similarly, the following Examples and Comparative Examples are collectively shown in Tables 1 and 2.

Example 2

A separator was prepared in a manner similar to Example 1 except that a coating amount of a heat-resistant porous layer was changed to 2.3 g/m².

Example 3

A separator was prepared in a manner similar to Example 1 except that a mass ratio of inorganic particles in a heat-resistant porous layer was changed to 50% by mass.

Example 4

A separator was prepared in a manner similar to Example 1 except that a mass ratio of inorganic particles in a heat-resistant porous layer was changed to 90% by mass.

Comparative Example 1

A separator was prepared in a manner similar to Example 1 except that magnesium hydroxide particles having an average primary particle diameter of 0.5 μm were used and a coating amount of a heat-resistant porous layer was changed to 3.1 g/m².

Comparative Example 2

A separator was prepared in a manner similar to Example 1 except that magnesium hydroxide particles having an average primary particle diameter of 0.9 μm were used and a coating amount of a heat-resistant porous layer was changed to 2.9 g/m².

Comparative Example 3

Alumina particles (Sumitomo Chemical Co., Ltd., AKP-3000, volume average particle diameter 0.45 μm, tetrapod particles), carboxymethyl cellulose (Daicel FineChem Ltd., D1200, degree of etherification of from 0.8 to 1.0) as a viscosity modifier, an acrylic resin (DIC Corporation, DICNAL LSE-16AD4) as a binder resin, and a nonionic surfactant (San Nopco Ltd., SN Wet 366) were mixed at a mass ratio of 94.6:3.8:1.4:0.2, and was added with and dispersed to prepare a coating liquid having a solid content concentration of 40% by mass.

A PVDF particle dispersion liquid (solid content concentration: 7% by mass) in which polyvinylidene fluoride resin particles (melting point: 140° C., volume average particle diameter: 0.2 μm) were dispersed in water was prepared.

An appropriate amount of the coating liquid was placed on a pair of Meyer bars, a polyethylene microporous film (thickness 6 μm, porosity 40%, Gurley value 100 seconds/100 mL) was passed between the Meyer bars, an equal amount of the coating liquid was applied to both sides, and the coating liquid was dried. Then, this was passed between a pair of bar coaters on which an appropriate amount of the PVDF particle dispersion was placed, and the PVDF particle dispersion was applied in equal amounts to both sides, and dried. In this way, a separator in which a heat-resistant porous layer and an adhesive layer were formed on both sides of a polyethylene microporous membrane was obtained.

Example 5

Meta-aramid (polymetaphenylene isophthalamide, CONEX (registered trademark) manufactured by TEIJIN CORPORATION) and barium sulfate particles (average primary particle diameter 0.05 μm) were stirred and mixed in dimethylacetamide (DMAc) so that the mass ratio of both was 20:80 and a concentration of the meta-aramid was 4.5% by mass to obtain a coating liquid.

An aqueous dispersion (solid content concentration: 7% by mass) in which polyvinylidene fluoride resin particles (melting point: 140° C., volume average particle diameter: 0.2 μm; PVDF particles) and acrylic resin particles (glass transition temperature: 59° C., volume average particle diameter: 0.5 μm) were dispersed in water at a mass ratio of 70:30 was prepared.

An appropriate amount of the coating liquid was placed on a pair of Meyer bars, a polyethylene microporous film (thickness 6 μm, porosity 40%, Gurley value 100 seconds/100 mL) was passed between the Meyer bars, and an equal amount of the coating liquid was applied to both sides. This was immersed in a coagulation liquid (DMAc:water=50:50 [mass ratio], liquid temperature 40° C.) to solidify a coating layer, then washed in a water washing tank having a water temperature of 40° C., and dried to form a heat-resistant porous layer having a coating amount of 3.2 g/m². Subsequently, this was passed between a pair of bar coaters on which an appropriate amount of the aqueous dispersion was placed, and an equal amount of the aqueous dispersion was applied to both sides and dried. In this way, a separator in which a heat-resistant porous layer and an adhesive layer were formed on both sides of a polyethylene microporous membrane was obtained.

Example 6

4200 g of N-methylpyrrolidone (NMP) was charged in a flask, 272.65 g of calcium chloride dried at 200° C. for 2 hours was added thereto, and temperature was raised to 100° C. After calcium chloride was completely dissolved, a liquid temperature was returned to room temperature, and 132.91 g of paraphenylenediamine was added to completely dissolve a compound. While this solution was maintained at 20±2° C., 243.32 g of terephthalic acid dichloride was added in 10 portions every about 5 minutes. Next, the solution was aged for 1 hour while being maintained at 20±2° C., and stirred for 30 minutes under reduced pressure to remove air bubbles. Then, an NMP solution was gradually added to 100 g of the polymerization liquid to adjust a concentration of polyparaphenylene terephthalamide (PPTA) to 2% by mass. PPTA and magnesium hydroxide particles (average primary particle diameter: 0.3 μm) were stirred and mixed so that the mass ratio of both was 20:80 to obtain a coating liquid.

An aqueous dispersion (solid content concentration: 7% by mass) in which polyvinylidene fluoride resin particles (melting point: 140° C., volume average particle diameter: 0.2 μm; PVDF particles) and acrylic resin particles (glass transition temperature: 59° C., volume average particle diameter: 0.5 μm) were dispersed in water at a mass ratio of 70:30 was prepared.

An appropriate amount of the coating liquid was placed on a pair of Meyer bars, a polyethylene microporous film (thickness 6 μm, porosity 40%, Gurley value 100 seconds/100 mL) was passed between the Meyer bars, and an equal amount of the coating liquid was applied to both sides. This was immersed in a coagulation liquid (NMP:water=40:60 [mass ratio], liquid temperature 40° C.) to solidify a coating layer, then washed in a water washing tank having a water temperature of 40° C., and dried to form a heat-resistant porous layer having a coating amount of 3.0 g/m². Subsequently, this was passed between a pair of bar coaters on which an appropriate amount of the aqueous dispersion was placed, and an equal amount of the aqueous dispersion was applied to both sides and dried. In this way, a separator in which a heat-resistant porous layer and an adhesive layer were formed on both sides of a polyethylene microporous membrane was obtained.

Example 7

A separator was prepared in a manner similar to Example 5 except that barium sulfate particles having an average primary particle diameter of 0.03 μm were used as inorganic particles, a coating amount of a heat-resistant porous layer was 3.0 g/m², and a polyethylene microporous membrane having a thickness of 7 μm, a porosity of 35%, and a Gurley value of 160 seconds/100 mL was used as a porous substrate.

Example 8

Except that a coating amount of a heat-resistant porous layer was 2.4 g/m², the same procedure as in Example 7 was carried out to prepare a separator.

Example 9

Polyamideimide (Solvay, Torlon 4000 TF) and magnesium hydroxide particles (average primary particle diameter 0.3 μm) were stirred and mixed in dimethylacetamide (DMAc) so that a mass ratio of both was 20:80 and a concentration of polyamideimide was 8% by mass to obtain a coating liquid.

An aqueous dispersion (solid content concentration: 7% by mass) in which polyvinylidene fluoride resin particles (melting point: 140° C., volume average particle diameter: 0.2 μm) and acrylic resin particles (glass transition temperature: 59° C., volume average particle diameter: 0.5 μm) were dispersed in water at a mass ratio of 70:30 was prepared.

An appropriate amount of the coating liquid was placed on a pair of Meyer bars, a polyethylene microporous film (thickness 6 μm, porosity 40%, Gurley value 100 seconds/100 mL) was passed between the Meyer bars, and an equal amount of the coating liquid was applied to both sides. This was immersed in a coagulation liquid (DMAc:water=40:60 [mass ratio], liquid temperature 40° C.) to solidify the coating layer, then washed in a water washing tank having a water temperature of 40° C., and dried. Subsequently, this was passed between a pair of bar coaters on which an appropriate amount of the aqueous dispersion was placed, and an equal amount of the aqueous dispersion was applied to both sides and dried. In this way, a separator in which a heat-resistant porous layer and an adhesive layer were formed on both sides of a polyethylene microporous membrane was obtained.

Example 10

Polyimide (PI Technical Laboratory, Q-VR-X 1444) and magnesium hydroxide particles (average primary particle diameter: 0.3 μm) were stirred and mixed in a mixed solvent of dimethylacetamide (DMAc) and tripropylene glycol (TPG) (DMAc:TPG=90:10 [mass ratio]) so that a mass ratio of both was 20:80 and a concentration of polyimide was 6% by mass to obtain a coating liquid.

An aqueous dispersion (solid content concentration: 7% by mass) in which polyvinylidene fluoride resin particles (melting point: 140° C., volume average particle diameter: 0.2 μm; PVDF particles) and acrylic resin particles (glass transition temperature: 59° C., volume average particle diameter: 0.5 μm) were dispersed in water at a mass ratio of 70:30 was prepared.

An appropriate amount of the coating liquid was placed on a pair of Meyer bars, a polyethylene microporous film (thickness 6 μm, porosity 40%, Gurley value 100 seconds/100 mL) was passed between the Meyer bars, and an equal amount of the coating liquid was applied to both sides. This was immersed in a coagulation liquid (DMAc:TPG:water=36:4:60 [mass ratio], liquid temperature 40° C.) to solidify the coating layer, then washed in a water washing tank having a water temperature of 40° C., and dried. Subsequently, this was passed between a pair of bar coaters on which an appropriate amount of the aqueous dispersion was placed, and an equal amount of the aqueous dispersion was applied to both sides and dried. In this way, a separator in which a heat-resistant porous layer and an adhesive layer were formed on both sides of a polyethylene microporous membrane was obtained.

Example 11

A polyvinylidene fluoride type resin (VDF-HFP copolymer, VDF:HFP (molar ratio)=97.6:2.4, weight average molecular weight 1.13 million; PVDF) was dissolved in a mixed solvent of dimethylacetamide (DMAc) and tripropylene glycol (TPG) (DMAc:TPG=90:10 [mass ratio]) so as to have a resin concentration of 4% by mass, and barium sulfate particles (average primary particle diameter 0.05 µm) were further stirred and mixed to obtain a coating liquid. In the coating liquid, the mass ratio of the polyvinylidene fluoride type resin and the barium sulfate particles was 20:80.

An aqueous dispersion (solid content concentration: 7% by mass) in which polyvinylidene fluoride resin particles (melting point: 140° C., volume average particle diameter: 0.2 µm; PVDF particles) and acrylic resin particles (glass transition temperature: 59° C., volume average particle diameter: 0.5 µm) were dispersed in water at a mass ratio of 70:30 was prepared.

An appropriate amount of the coating liquid was placed on a pair of Meyer bars, a polyethylene microporous film (thickness 6 µm, porosity 40%, Gurley value 100 seconds/ 100 mL) was passed between the Meyer bars, and an equal amount of the coating liquid was applied to both sides. This was immersed in a coagulation liquid (DMAc:TPG:water=36:4:60 [mass ratio], liquid temperature 40° C.) to solidify the coating layer, then washed in a water washing tank having a water temperature of 40° C., and dried. Subsequently, this was passed between a pair of bar coaters on which an appropriate amount of the aqueous dispersion was placed, and an equal amount of the aqueous dispersion was applied to both sides and dried. In this way, a separator in which a heat-resistant porous layer and an adhesive layer were formed on both sides of a polyethylene microporous membrane was obtained.

Example 12

Except that the coating amount of the heat-resistant porous layer was 10.2 g/m², and a polyethylene microporous film having a thickness of 7 µm, a porosity of 35%, and a Gurley value of 160 seconds/100 mL was used as a porous substrate, the same procedure as in Example 5 was carried out to prepare a separator.

TABLE 1

| | | Example 1 | Example 2 | Example 3 | Example 4 | Comparative Example 1 | Comparative Example 2 | Comparative Example 3 |
|---|---|---|---|---|---|---|---|---|
| Porous substrate | Material | PE | PE | PE | PE | PE | PE | PE |
| | Film thickness (µm) | 6 | 6 | 6 | 6 | 6 | 6 | 6 |
| | Gurley value (sec/100 mL) | 100 | 100 | 100 | 100 | 100 | 100 | 100 |
| Heat-resistant porous layer | Binder resin | Meta-aramid | Meta-aramid | Meta-aramid | Meta-aramid | Meta-aramid | Meta-aramid | Acryl |
| | Material of inorganic particle | Mg (OH)₂ | Mg (OH)₂ | Mg (OH)₂ | Mg (OH)₂ | Mg (OH)₂ | Mg (OH)₂ | Al₂O₃ |
| | Average primary particle diameter of inorganic particle (µm) | 0.30 | 0.30 | 0.30 | 0.30 | 0.50 | 0.90 | 0.45 |
| | Content of inorganic particle (% by mass) | 80 | 80 | 50 | 90 | 80 | 80 | 94.6 |
| | Coating amount (g/m²) | 3.0 | 2.3 | 3.0 | 3.0 | 3.1 | 2.9 | 3.0 |
| | Film thickness (µm) | 5.0 | 3.6 | 4.9 | 4.8 | 4.6 | 5.5 | 5.0 |
| | Single-sided film thickness (µm) | 2.5 | 1.8 | 2.5 | 2.4 | 2.3 | 2.8 | 2.5 |
| | Porosity (%) | 70 | 68 | 70 | 69 | 67 | 74 | 82 |
| Adhesive layer | Material | PVDF particle/acryl particle | PVDF particle/acryl particle | PVDF particle/acryl particle | PVDF particle/acryl particle | PVDF particle/acryl particle | PVDF particle/acryl particle | PVDF particle |
| | Coating amount (g/m²) | 0.6 | 0.6 | 0.6 | 0.6 | 0.6 | 0.6 | 0.6 |
| Separator | Film thickness (µm) | 11.0 | 9.6 | 10.9 | 10.8 | 10.6 | 11.5 | 11.0 |
| | Basis weight (g/m²) | 7.1 | 6.4 | 7.1 | 7.1 | 7.2 | 7.0 | 7.1 |
| | Gurley value (sec/100 mL) | 137 | 138 | 135 | 132 | 134 | 135 | 114 |
| | Gurley difference (sec/100 mL) | 37 | 38 | 35 | 32 | 34 | 35 | 14 |
| | Heat shrinkage ratio 130° C. MD(%) | 4.8 | 5.9 | 4.5 | 4.8 | 6.5 | 12.7 | 9.8 |
| | Heat shrinkage ratio 130° C. TD(%) | 4.1 | 5.2 | 4.0 | 4.0 | 8.5 | 16.2 | 9.6 |
| | Heat shrinkage ratio 150° C. MD(%) | 7.4 | 9.4 | 7.2 | 7.5 | 9.7 | 16.5 | 15.0 |
| | Heat shrinkage ratio 150° C. TD(%) | 7.8 | 9.4 | 7.5 | 7.6 | 16.5 | 23.0 | 15.4 |
| | Peel strength (N/m) | 24 | 31 | 53 | 29.0 | 16 | 32 | 4 |
| Battery evaluation | Adhesive strength between electrode and separator (%) | 136 | 127 | 125 | 110 | 100 | 91 | 92 |
| | Measurement of thermal conductivity | B | B | C | A | B | B | A |
| | Production yield | A | A | A | A | B | B | C |
| | Battery swelling | A | A | B | A | A | A | C |
| | Collision test | B | B | B | B | C | C | C |

TABLE 2

| | | Example 5 | Example 6 | Example 7 | Example 8 | Example 9 | Example 10 | Example 11 | Example 12 |
|---|---|---|---|---|---|---|---|---|---|
| Porous substrate | Material | PE | PE | PE | PE | PE | PE | PE | PE |
| | Film thickness (μm) | 6 | 6 | 7 | 7 | 6 | 6 | 6 | 7 |
| | Gurley value (sec/100 mL) | 100 | 100 | 160 | 160 | 100 | 100 | 100 | 160 |
| Heat-resistant porous layer | Binder resin | Meta-aramid | PPTA | Meta-aramid | Meta-aramid | Polyamide-imide | Polyimide | PVDF | Meta-aramid |
| | Material of inorganic particle | BaSO$_4$ | Mg (OH)$_2$ | BaSO$_4$ | BaSO$_4$ | Mg (OH)$_2$ | Mg (OH)$_2$ | BaSO$_4$ | BaSO$_4$ |
| | Average primary particle diameter of inorganic particle (μm) | 0.05 | 0.30 | 0.03 | 0.03 | 0.30 | 0.30 | 0.05 | 0.05 |
| | Content of inorganic particle (% by mass) | 80 | 80 | 80 | 80 | 80 | 80 | 80 | 80 |
| | Coating amount (g/m$^2$) | 3.2 | 3.0 | 3.0 | 2.4 | 3.0 | 3.0 | 3.0 | 10.2 |
| | Film thickness (μm) | 2.4 | 3.5 | 1.6 | 1.3 | 4.5 | 4.5 | 2.0 | 8.1 |
| | Single-sided film thickness (μm) | 1.2 | 1.8 | 0.8 | 0.7 | 2.3 | 2.3 | 1.0 | 4.1 |
| | Porosity (%) | 57 | 58 | 36 | 51 | 67 | 67 | 56 | 59 |
| Adhesive layer | Material | PVDF particle/acryl particle | PVDF particle/acryl particle | PVDF particle/acryl particle | PVDF particle/acryl particle | PVDF particle/acryl particle | PVDF particle/acryl particle | PVDF particle/acryl particle | PVDF particle/acryl particle |
| | Coating amount (g/m$^2$) | 0.6 | 0.6 | 0.6 | 0.6 | 0.6 | 0.6 | 0.6 | 0.6 |
| Separator | Film thickness (μm) | 8.4 | 9.5 | 9.0 | 8.7 | 10.5 | 10.5 | 8.0 | 15.5 |
| | Basis weight (g/m$^2$) | 7.3 | 7.1 | 8.2 | 7.6 | 7.1 | 7.1 | 7.1 | 15.4 |
| | Gurley value (sec/100 mL) | 146 | 143 | 232 | 234 | 139 | 141 | 250 | 212 |
| | Gurley difference (sec/100 mL) | 46 | 43 | 72 | 74 | 39 | 41 | 150 | 52 |
| | Heat shrinkage ratio 130° C. MD(%) | 3.0 | 4.5 | 2.9 | 4.0 | 5.6 | 5.7 | 6 | 2.6 |
| | Heat shrinkage ratio 130° C. TD(%) | 2.5 | 4.0 | 1.8 | 2.1 | 5.2 | 5.1 | 5.1 | 2.3 |
| | Heat shrinkage ratio 150° C. MD(%) | 4.4 | 7.1 | 3.3 | 5.3 | 8.9 | 8.8 | 9.4 | 4.1 |
| | Heat shrinkage ratio 150° C. TD(%) | 4.1 | 7.3 | 2.7 | 6.9 | 9.2 | 9.0 | 9.5 | 4.1 |
| | Peel strength (N/m) | 58 | 21 | 63 | 84 | 22 | 20 | 25 | 17 |
| Battery evaluation | Adhesive strength between electrode and separator (%) | 131 | 118 | 120 | 116 | 111 | 115 | 135 | 105 |
| | Measurement of thermal conductivity | A | B | A | A | B | B | A | B |
| | Production yield | A | A | A | A | A | A | A | B |
| | Battery swelling | A | A | A | A | A | A | A | A |
| | Collision test | A | A | A | A | A | A | A | B |

As shown in Tables 1 and 2, the separators of Examples exhibited excellent heat resistance as compared with Comparative Examples while being formed into a thin film.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, the separator comprising:

a porous substrate;

a heat-resistant porous layer that is provided on one side or on both sides of the porous substrate, and that contains a binder resin and inorganic particles, the inorganic particles having an average primary particle diameter from 0.01 μm to less than 0.45 μm; and an adhesive layer that is provided on one side or on both sides of a laminated body of the porous substrate and the heat-resistant porous layer, the adhesive layer comprising a plurality of adhesive resin particles adhered to the laminated body, wherein the binder resin contains at least one selected from the group consisting of a wholly aromatic polyamide, a polyamideimide, a polyether sulfone, a polysulfone, a polyether ketone, a polyketone, a polyether imide, and a copolymerized polyether polyamide, wherein a mass ratio of the inorganic particles in the heat-resistant porous layer is 50% by mass to 90% by mass with respect to a total mass of the heat-resistant porous layer, wherein a mass per unit area of the heat-resistant porous layer as a total of both sides is from 2.0 g/m$^2$ to 10.0 g/m$^2$, and wherein the inorganic particles contain at least one of magnesium hydroxide particles or barium sulfate particles.

2. The separator for a non-aqueous secondary battery according to claim 1, wherein a heat shrinkage ratio of the separator for a non-aqueous secondary battery, when heat-treated at 150° C. for 1 hour, is 10% or less in an MD direction and in a TD direction.

3. The separator for a non-aqueous secondary battery according to claim 1, wherein a heat shrinkage ratio of the separator for a non-aqueous secondary battery, when heat-treated at 130° C. for 1 hour, is 6% or less in an MD direction and in a TD direction.

4. The separator for a non-aqueous secondary battery according to claim 1, wherein a porosity of the heat-resistant porous layer is from 30% to 70%.

5. The separator for a non-aqueous secondary battery according to claim 1, wherein a thickness of the heat-resistant porous layer is 0.5 μm to 4.0 μm per one side.

6. The separator for a non-aqueous secondary battery according to claim 1, wherein a difference between a Gurley value of the separator for a non-aqueous secondary battery and a Gurley value of the porous substrate is from 20 seconds/100 mL to 300 seconds/100 mL.

7. A non-aqueous secondary battery that obtains electromotive force by lithium doping and dedoping, the non-aqueous secondary battery comprising:

a positive electrode;

a negative electrode; and the separator for a non-aqueous secondary battery according to claim 1, the separator being disposed between the positive electrode and the negative electrode.

8. A separator for a non-aqueous secondary battery, the separator comprising:

a porous substrate;

a heat-resistant porous layer that is provided on one side or on both sides of the porous substrate, and that contains a binder resin and inorganic particles, the inorganic particles having an average primary particle diameter from 0.01 μm to less than 0.45 μm; and an adhesive layer that is provided on one side or on both sides of a laminated body of the porous substrate and the heat-resistant porous layer, the adhesive layer comprising a plurality of adhesive resin particles adhered to the laminated body, wherein the adhesive resin particles contain first adhesive resin particles including a polyvinylidene fluoride type resin and/or second adhesive resin particles including an acrylic type resin, wherein a mass ratio of the inorganic particles in the heat-resistant porous layer is 50% by mass to 90% by mass with respect to a total mass of the heat-resistant porous layer, wherein a mass per unit area of the heat-resistant porous layer as a total of both sides is from 2.0 g/m² to 10.0 g/m², and wherein the inorganic particles contain at least one of magnesium hydroxide particles or barium sulfate particles.

9. The separator for a non-aqueous secondary battery according to claim 8, wherein a heat shrinkage ratio of the separator for a non-aqueous secondary battery, when heat-treated at 150° C. for 1 hour, is 10% or less in an MD direction and in a TD direction.

10. The separator for a non-aqueous secondary battery according to claim 8, wherein a heat shrinkage ratio of the separator for a non-aqueous secondary battery, when heat-treated at 130° C. for 1 hour, is 6% or less in an MD direction and in a TD direction.

11. The separator for a non-aqueous secondary battery according to claim 8, wherein a porosity of the heat-resistant porous layer is from 30% to 70%.

12. The separator for a non-aqueous secondary battery according to claim 8, wherein a thickness of the heat-resistant porous layer is 0.5 μm to 4.0 μm per one side.

13. The separator for a non-aqueous secondary battery according to claim 8, wherein a difference between a Gurley value of the separator for a non-aqueous secondary battery and a Gurley value of the porous substrate is from 20 seconds/100 mL to 300 seconds/100 mL.

14. A non-aqueous secondary battery that obtains electromotive force by lithium doping and dedoping, the non-aqueous secondary battery comprising:

a positive electrode;

a negative electrode; and the separator for a non-aqueous secondary battery according to claim 8, the separator being disposed between the positive electrode and the negative electrode.

* * * * *